(12) United States Patent
Kim et al.

(10) Patent No.: US 9,583,963 B2
(45) Date of Patent: Feb. 28, 2017

(54) APPARATUS AND METHOD OF MATCHING IN A SOURCE-TARGET STRUCTURE

(75) Inventors: Nam Yun Kim, Seoul (KR); Eun Seok Park, Suwon-si (KR); Sang Wook Kwon, Seongnam-si (KR); Young Tack Hong, Suwon-si (KR); Young Ho Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 881 days.

(21) Appl. No.: 13/093,971

(22) Filed: Apr. 26, 2011

(65) Prior Publication Data

US 2011/0266880 A1 Nov. 3, 2011

(30) Foreign Application Priority Data

May 3, 2010 (KR) .................. 10-2010-0041343

(51) Int. Cl.
*H02J 7/02* (2016.01)
*H02J 7/00* (2006.01)

(52) U.S. Cl.
CPC ............ *H02J 7/025* (2013.01); *H02J 7/0004* (2013.01)

(58) Field of Classification Search
USPC ........................................... 307/104
See application file for complete search history.

(56) References Cited

U.S. PATENT DOCUMENTS

| | | | | |
|---|---|---|---|---|
| 6,131,301 A | * | 10/2000 | Sutherland | G01B 21/045 33/558 |
| 6,665,239 B1 | * | 12/2003 | Takahashi | G11B 7/0929 369/112.01 |
| 6,747,434 B2 | * | 6/2004 | Pigott | G05B 19/40 318/685 |
| 7,592,753 B2 | | 9/2009 | Baarman et al. | |

(Continued)

FOREIGN PATENT DOCUMENTS

| | | |
|---|---|---|
| JP | 2001-238372 | 8/2001 |
| JP | 2007-329674 A | 12/2007 |

(Continued)

OTHER PUBLICATIONS

Korean Office Action issued on Dec. 1, 2016 in counterpart Korean Application No. 10-2010-0041343 (11 pages in English; 8 pages in Korean).

*Primary Examiner* — Rexford Barnie
*Assistant Examiner* — Daniel Kessie
(74) *Attorney, Agent, or Firm* — NSIP Law

(57) ABSTRACT

Provided is a source-target structure matching controlling apparatus and method that may perform matching control of a source-target structure while resonance power is transmitted and received through the source-target structure. The source-target structure matching controlling apparatus may include a target resonator to receive, from a resonance power transmitter, the resonance power through a magnetic-coupling, and a rectifier to rectify the resonance power to generate a DC voltage, and provide the DC voltage to a load.

(Continued)

The source-target structure matching controlling apparatus may detect an impedance of the load and a variance in the impedance, and may transmit, to the resonance power transmitter, information associated with the variance in the impedance of the load.

21 Claims, 20 Drawing Sheets

(56) References Cited

U.S. PATENT DOCUMENTS

| | | | | |
|---|---|---|---|---|
| 8,351,856 | B2* | 1/2013 | Baarman | A61L 2/10 235/492 |
| 8,378,524 | B2* | 2/2013 | Mita | B60L 11/182 307/104 |
| 8,378,525 | B2* | 2/2013 | Yoshikawa | H02J 5/005 307/104 |
| 8,452,235 | B2* | 5/2013 | Kirby | H04B 5/0031 307/104 |
| 8,633,615 | B2* | 1/2014 | Lee | H02J 5/005 235/451 |
| 2007/0046433 | A1* | 3/2007 | Mukherjee | G06K 19/0672 340/10.1 |
| 2008/0238364 | A1* | 10/2008 | Weber | H02J 7/025 320/108 |
| 2009/0284245 | A1 | 11/2009 | Kirby et al. | |
| 2010/0109443 | A1* | 5/2010 | Cook | H01Q 1/2225 307/104 |
| 2010/0148723 | A1* | 6/2010 | Cook | G06K 7/0008 320/108 |
| 2010/0165593 | A1* | 7/2010 | Townsend | G08B 21/0446 361/807 |
| 2010/0201189 | A1* | 8/2010 | Kirby | H04B 5/0037 307/9.1 |
| 2010/0264746 | A1* | 10/2010 | Kazama | H02J 7/025 307/104 |
| 2010/0314947 | A1* | 12/2010 | Baarman | H02J 5/005 307/104 |
| 2011/0049995 | A1* | 3/2011 | Hashiguchi | H02J 5/005 307/104 |
| 2011/0127951 | A1* | 6/2011 | Walley | H02J 5/005 320/108 |
| 2011/0163609 | A1* | 7/2011 | Wada | H02J 5/005 307/104 |
| 2011/0175455 | A1* | 7/2011 | Hashiguchi | H02J 17/00 307/104 |
| 2011/0198938 | A1* | 8/2011 | Park | H02J 17/00 307/104 |
| 2011/0241440 | A1* | 10/2011 | Sakoda | H02J 5/005 307/104 |
| 2011/0298294 | A1* | 12/2011 | Takada | B60L 11/182 307/104 |
| 2012/0025624 | A1* | 2/2012 | Lee | H02J 7/025 307/104 |
| 2012/0153738 | A1* | 6/2012 | Karalis | B60L 3/0069 307/104 |

FOREIGN PATENT DOCUMENTS

| | | |
|---|---|---|
| JP | 2008-154446 A | 7/2008 |
| JP | 2008-237007 | 10/2008 |
| JP | 2009-060736 | 3/2009 |
| JP | 2009-070087 | 4/2009 |
| KR | 10-2007-0008576 | 1/2007 |
| KR | 10-2008-0095642 | 10/2008 |
| KR | 10-2009-0124119 | 12/2009 |
| KR | 10-2010-0017073 A | 2/2010 |

* cited by examiner

APPARATUS AND METHOD OF MATCHING IN A SOURCE-TARGET STRUCTURE

CROSS-REFERENCE TO RELATED APPLICATION(S)

This application claims the benefit under 35 U.S.C. §119 (a) of Korean Patent Application No. 10-2010-0041343, filed on May 3, 2010, in the Korean Intellectual Property Office, the entire disclosure of which is incorporated herein by reference for all purposes.

BACKGROUND

1. Field

The following description relates to a radio wireless power transmission technology for transmitting resonance power through magnetic-coupling, and more particularly, to a matching-controlling apparatus and method that performs matching-control, while transmitting and receiving resonance power.

2. Description of Related Art

With the development of Information Technology (IT), a larger variety and a larger amount of portable electronic devices have been released. Due to characteristics of the portable electronic devices, battery performance is becoming a critical issue. In addition to the portable electronic devices, home electronic appliances have the ability to wirelessly transmit data and can be supplied with power over a power line.

Researches are being conducted on wireless power transmission technology that may wirelessly supply power. Because a distance between a source resonator and a target resonator may vary over time and a matching condition for both resonators may also vary over time, due to various features of a wireless environment, the effectiveness of wireless power transmission may also vary.

SUMMARY

In one general aspect, there is provided an apparatus for controlling matching in a source-target structure that transmits and receives resonance power, the apparatus including a target resonator to receive resonance power through magnetic-coupling with a resonance power transmitter, a rectifier to rectify the resonance power to generate a DC voltage, and to provide the DC voltage to a load, a load sensor to detect an impedance of the load and a variation in the impedance of the load, and a target communicating unit to transmit information associated with the variation in the impedance of the load to the resonance power transmitter.

The load sensor may sense a voltage that is applied to the load and an amount of current that is flowing through the load, to detect the variation in the impedance of the load.

The target communicating unit may comprise an in-band communicating unit to transmit information associated with the variation in the impedance of the load through a resonance frequency of the target resonator, to the resonance power transmitter, and an out-band communicating unit to transmit information associated with the variation in the impedance of the load through a frequency band that is allocated for communication with the resonance power transmitter, to the resonance power transmitter.

The resonance power transmitter may comprise a source communicating unit to receive information associated with the variation in the impedance of the load, from the target communicating unit, and a matching-controller to perform impedance-matching of a source resonator based on the information associated with the variation in the impedance of the load.

The impedance-matching may be performed to adjust an impedance to 50 ohms.

The apparatus may further comprise a received-power monitoring unit to monitor resonance power that is received from the resonance power transmitter, a reflected-power monitoring unit to monitor a reflected-power of the received resonance power, and a target matching controller (MCU) to control the matching-controller to perform impedance-matching when at least one of the reflected power and a variation in power to be used by the load is sensed.

The target MCU may control the matching-controller based on one of a first table that records a value of a variation in an impedance corresponding to a variation in the power to be used by the load, and a second table that records a value of a variation in an impedance corresponding to a charged level of the load.

The target controller may control the target resonator to have the same impedance as the impedance of the load.

In another aspect, there is provided an apparatus for controlling matching in a source-target structure that transmits and receives resonance power, the apparatus including a source resonator to transmit resonance power through magnetic-coupling with a resonance power receiver, a matching-controller to control impedance-matching of the source resonator, a source power monitoring unit to monitor resonance power that is applied to the source resonator, a reflected-power monitoring unit to monitor a reflected-power of the resonance power that is output from the source resonator, and a source matching controller (MCU) to control the matching-controller to perform the impedance-matching of the source resonator, when at least one of the reflected power and a variation in power to be used by the resonance power receiver is sensed.

The apparatus may further comprise a source communicating unit to receive information associated with the variation in the impedance of a load, from the resonance power receiver, wherein the source MCU may control the matching-controller to perform the impedance-matching based on the information that is associated with the variation in the impedance of the load.

The matching-controller may control an impedance of the source resonator to be the same as the impedance of the load, and the impedance of the load being sensed by the resonance power receiver may have a value between 10 ohms and 100 ohms.

In another aspect, there is provided a method of controlling matching in a source-target structure that transmits and receives resonance power, the method including detecting an impedance of a load connected with a resonance power receiver and a variation in the impedance of the load, transmitting, to a resonance power transmitter, information that is associated with the variation in the impedance of the load, and receiving, from the resonance power transmitter, resonance power based on the variation in the impedance.

The variation in the impedance of the load may be detected by sensing a voltage that is applied to the load and an amount of current flowing through the load.

The method may further comprise receiving, by the resonance power transmitter, the information that is associated with the variation in the impedance of the load, and performing impedance-matching of a source resonator based on the information that is associated with the variation in the impedance of the load.

The transmitting may comprise transmitting, to the resonance power transmitter, the information that is associated with the variation in the impedance of the load and information that is associated with an identification of the resonance power receiver.

In another aspect, there is provided a method of controlling matching in a source-target structure that transmits and receives resonance power, the method including transmitting, to the resonance power receiver, the resonance power through a source resonator, monitoring the resonance power that is output from the source resonator, monitoring a reflected-power of the resonance power that is output from the source resonator, and performing impedance-matching of the source resonator, when at least one of the reflected power or a variation in power to be used by the resonance power receiver is sensed.

The method may further comprise receiving, by the resonance power receiver, the resonance power through a target resonator, monitoring the resonance power that is received by the target resonator, monitoring a target reflected power of the resonance power that is received by the target resonator, and performing, by the resonance power receiver, impedance-matching of the target resonator, when at least one of the target reflected power or a variation in power to be used by the load is sensed.

The impedance-matching of the target resonator may be performed based on one of a first table that records a value of a variation in an impedance corresponding to a variation in the power to be used by the load and a second table that records a value of a variation in an impedance corresponding to a charged level of the load.

In another aspect, there is provided a wireless power apparatus for powering a load with received wireless power, the wireless power apparatus including a resonator to receive power wirelessly from a source through magnetic coupling with the source, a sensor to detect an impedance of the load and to detect a variation in the impedance of the load, while the resonator is simultaneously receiving wireless power, and a matching control unit (MCU) to transmit information about the impedance of the load and the variation in the impedance of the load, to the source.

The sensor may detect the impedance of the load and the variation in the impedance of the load by sensing a voltage applied to the load and an amount of current flowing through the load.

The wireless power apparatus may further comprise a matching controller to perform impedance matching between the resonator and the load.

The MCU may transmit information to the source to enable the source to transmit an amount of wireless power that matches the amount of power to be used by the load.

The wireless power apparatus and the load may be included in the same device.

In response to the amount of power to be used by the load decreasing, the MCU may transmit information to the source to indicate to the source to decrease the amount of resonance power that is transmitted.

In response to the amount of power to be used by the load increasing, the MCU may transmit information to the source to indicate to the source to increase the amount of resonance power that is transmitted.

Other features and aspects may be apparent from the following detailed description, the drawings, and the claims.

Figure 1:
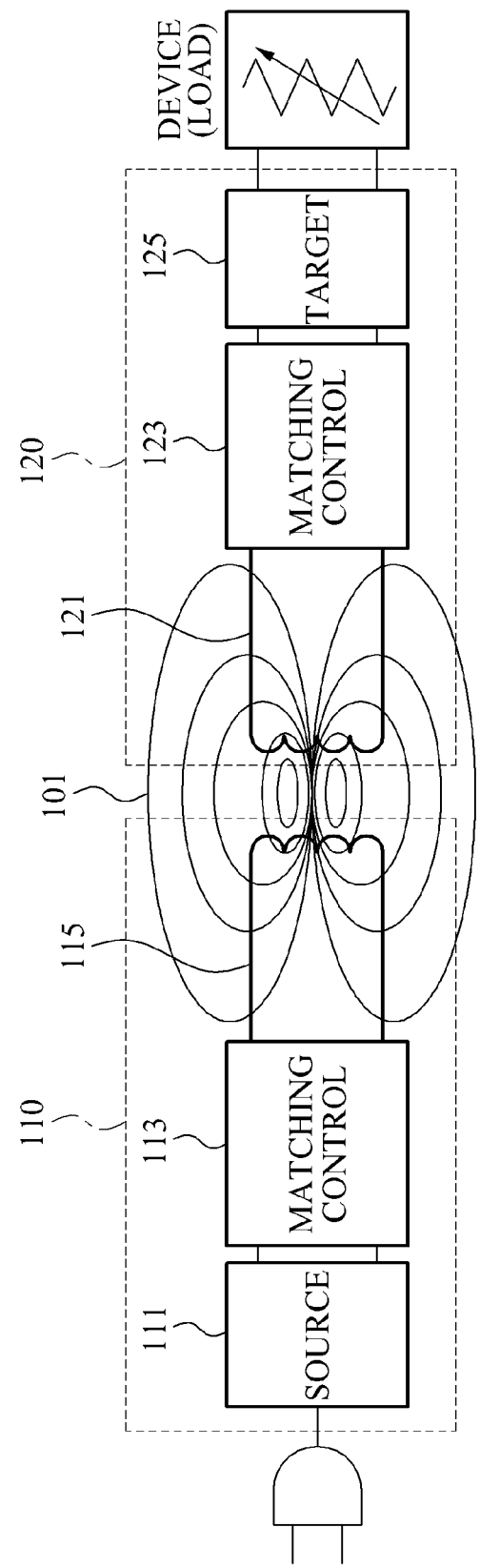
FIG. 1 is a diagram illustrating an example of a wireless power transmission system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of a wireless power transmission system.

For example, wireless power transmitted using the wireless power transmission system may be received as resonance power.

Referring to FIG. 1, the wireless power transmission system has a source-target structure that includes a source and a target. The wireless power transmission system includes a resonance power transmitter 110 corresponding to the source and a resonance power receiver 120 corresponding to the target.

In this example, the resonance power transmitter 110 includes a source unit 111 and a source resonator 115. For example, the source unit 111 may receive energy from an external voltage supplier to generate a resonance power. The resonance power transmitter 110 may further include a first matching control 113 to perform resonance frequency or impedance-matching. As another example, the source unit 111 may receive power wirelessly.

The source unit 111 may include, for example, one or more of an alternating current (AC)-to-AC (AC/AC) converter, an AC-to-direct current (DC) (AC/DC) converter, a (DC/AC) inverter, and the like. The AC/AC converter may adjust a signal level of an AC signal that is input from an external device. The AC/DC converter may output a DC voltage at a predetermined level by rectifying an AC signal that is output from the AC/AC converter. The DC/AC inverter may generate an AC signal, for example, of a few megahertz (MHz) to tens of MHz band by appropriately switching a DC voltage output from the AC/DC converter.

The source resonator 115 may transfer electromagnetic energy to a target resonator 121. For example, the source resonator 115 may transfer resonance power to the resonance power receiver 120 through magnetic-coupling 101 with the target resonator 121. The source resonator 115 may resonate within the set resonance bandwidth.

In this example, the resonance power receiver 120 includes the target resonator 121, a second matching control 123 to perform resonance frequency or impedance-matching, and a target unit 125 to transfer the received resonance power to a load.

For example, the target resonator 121 may receive electromagnetic energy from the source resonator 115. The target resonator 121 may also resonate within the set resonance bandwidth.

The target unit 125 may transfer the received resonance power to the load. The target unit 125 may include, for example, an AC/DC converter and a DC/DC converter. The AC/DC converter may generate a DC voltage by rectifying an AC signal transmitted from the source resonator 115 to the target resonator 121. The DC/DC converter may supply a rated voltage to a device or the load by adjusting a voltage level of the DC voltage.

As an example, the source resonator 115 and the target resonator 121 may be configured in a helix coil structured resonator, a spiral coil structured resonator, a meta-structured resonator, and the like.

Current flowing through the device may be changed while the device is operating in the wireless power transmission system of FIG. 1. When the current flowing through the device is changed, the load may be changed.

When a location of the source resonator 115 and a location of the target resonator 121 changes, if the source resonator 115 and/or the target resonator 121 move, power loss may occur. Thus, there is a desire for a method of effectively transmitting and receiving power, even if the location of the source resonator 115 and the target resonator 121 changes, or even if the source resonator 115 or the target resonator 121 moves.

For example, if a resonant coupling coefficient K between the source resonator 115 and the target resonator 121 changes, an impedance-matching may be performed.

In this example, impedance may be controlled for maximal power transmission between the resonance power transmitter 110 and the resonance power receiver 120.

Figure 2:
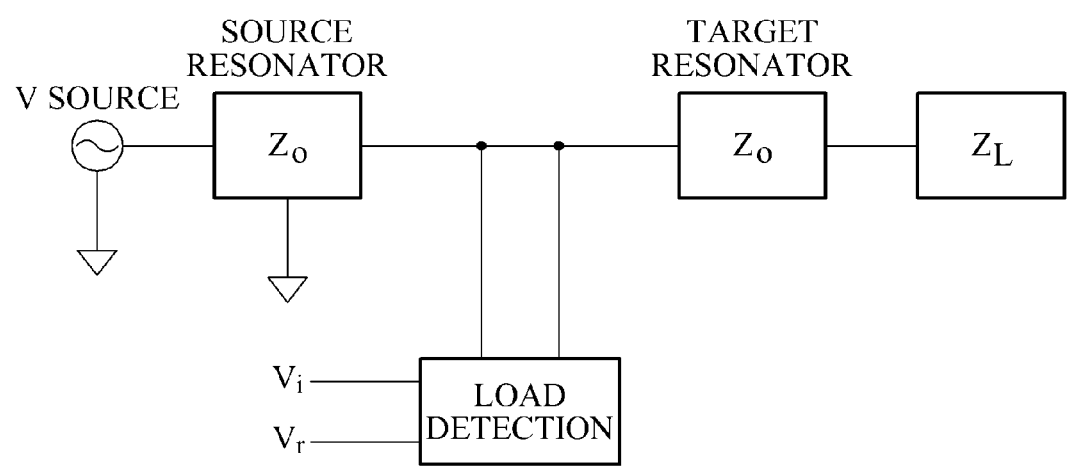
FIG. 2 is a diagram illustrating an example of a process of detecting a load.

FIG. 2 illustrates an example of a process of detecting a load.

Referring to FIG. 2, load detection may be performed between a source resonator and a target resonator. During resonance power transmission, a voltage relational expression that considers the impedance between the source resonator and the target resonator, may be defined as expressed by Equation 1.

$$V_{max} = |V_i| + |V_r| = |V_i| * (1 + |\Gamma|)$$
$$V_{min} = |V_i| - |V_r| = |V_i| * (1 - |\Gamma|)$$
$$VSWR = \frac{V_{max}}{V_{min}} = \left|\frac{V_i}{V_i}\right| \frac{*(1 + |\Gamma|)}{*(1 - |\Gamma|)} = \frac{1 + |\Gamma|}{1 - |\Gamma|}$$ [Equation 1]

In Equation 1, $V_i$ denotes an output voltage of the source resonator, and $V_r$ denotes a reflected voltage generated due to an impedance mismatching. A reflection coefficient $\Gamma$ of Equation 1 may be defined according to Equation 2.

$$\text{Reflection coefficient } (\Gamma) = \frac{V_r}{V_i} = \frac{Z_L - Z_o}{Z_L + Z_o}$$ [Equation 2]

FIGS. 3 through 6 illustrate examples of a source-target structure that transmits and receives resonance power.

Figure 3:
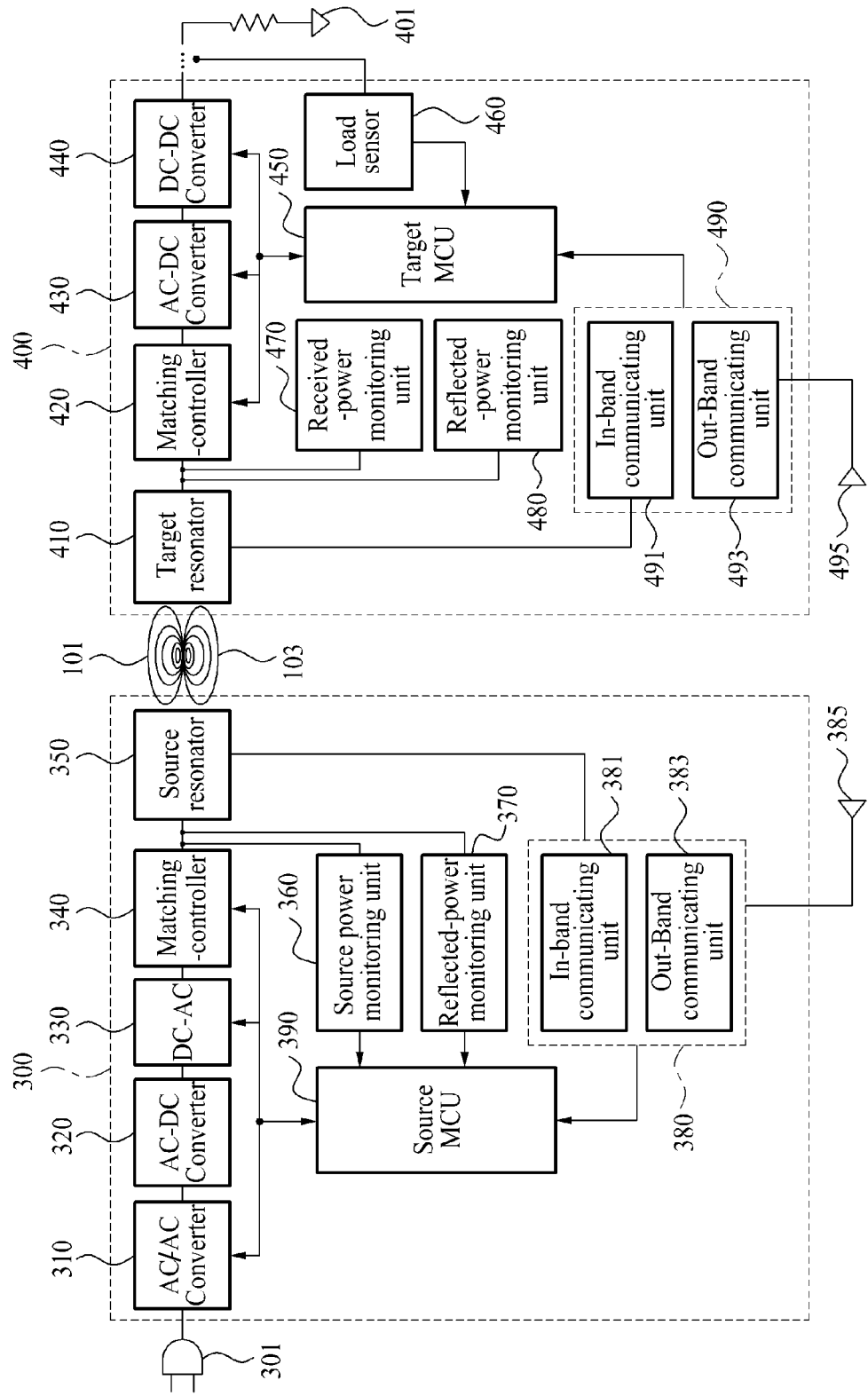
FIGS. 3 through 6 are diagrams illustrating examples of a source-target structure that transmits and receives resonance power.

Referring to FIG. 3, the source-target structure includes a resonance power transmitter 300 and a resonance power receiver 400. For example, a source-target structure matching-controlling apparatus may be included in each of the resonance power transmitter 300 and the resonance power receiver 400. As another example, a source-target structure matching-controlling apparatus may be included in only one of the resonance power transmitter 300 and the resonance power receiver 400.

In various aspects, the matching of the source-target structure may be, for example, an impedance-matching between the source resonator and the target resonator, and/or an impedance-matching between a resonance power receiver and a load, for example, a DC-DC Converter 440 and a load 401.

The source-target structure matching-controlling apparatus included in the resonance power transmitter 300 includes a source resonator 350, a matching-controller 340, a source power monitoring unit 360, a reflected-power monitoring unit 370, and a source matching controller (MCU) 390. In this example, the source-target structure matching-controlling apparatus further includes an AC/AC converter 310, an AC/DC converter 320, a DC/AC converter 330, and a source communicating unit 380.

The source-target structure matching-controlling apparatus included in the resonance power receiver 400 includes a target resonator 410, a rectifier (AC/DC converter) 430, a load sensor 460, and a target communicating unit 490. In this example, the source-target structure matching-controlling apparatus further includes a matching-controller 420, a DC/DC converter 440, a received-power monitoring unit 470, a reflected-power monitoring unit 480, and a target matching controller (MCU) 450.

The AC/AC converter 310 may adjust a signal level of an AC signal that is input from an external device 301. The AC signal that is input from the external device 310 may be, for example, an AC signal of 220 volts/60 Hz.

The AC/DC converter 320 may output a DC signal by rectifying the AC signal that is output from the AC/AC converter 310. For example, the AC/DC converter 320 may include a stabilizer circuit to output a predetermined level of DC voltage. A voltage level of the DC voltage that is output from the AC/DC converter 320 may be determined by an amount of power to be used by the resonance power receiver 400 or may be determined by controlling of the source MCU 390.

The DC/AC converter 330 may perform high-speed switching with respect to the DC voltage that is output from the AC/DC converter 320, and may generate an AC signal in a band of, for example, several MHz through several dozens of MHz. The DC/AC converter 330 may perform power conversion based on a switching pulse signal and the DC voltage that is output from the AC/DC converter 320.

The matching-controller 340 may control an impedance-matching of the source resonator 350. For example, the matching-controller 340 may adjust an impedance of the source resonator 350 based on a controlling of the source MCU 390. In this example, the impedance-matching may be performed between the source resonator 350 and the target resonator 410 to adjust the impedance, for example, to adjust the impedance to 33 ohms, 50 ohms, and the like.

The matching-controller 340 may adjust a voltage level or a current level of the AC signal that is output from the DC/AC converter 330, and may generate an AC resonance power in a sine waveform. In this example, the DC/AC converter 330 may be adjusted such that a voltage that is output is relatively higher in comparison to the voltage that is input. In addition, the current that is output may be relatively higher than the current that is input. For example, the DC/AC converter 330 may include a primary winding and a secondary winding, and may adjust a ratio of the primary winding and the secondary winding to enable the voltage that is output to be relatively higher than the voltage that is input. For example, if a number of windings of the primary winding is M and a number of windings of the secondary winding is N, the output voltage may be higher than the input voltage when N is greater than M.

The source resonator 350 may transmit resonance power to the resonance power receiver 400 through magnetic-coupling with the target resonance 410, for example, magnetic-coupling 101 and/or a magnetic-coupling 103.

The source power monitoring unit 360 may monitor an amount of resonance power applied to the source resonator 350 from the matching-controller 340, in real-time.

The reflected-power monitoring unit 370 may monitor a reflected-power of the resonance power that is output from the source resonator 350. For example, the reflected-power monitoring unit 370 may sense the reflected-power by coupling a reflected signal using a coupler (not illustrated). The reflected-power monitoring unit 370 may notify the source MCU 390 of information about whether the reflected-power is sensed and an amount of the reflected-power.

For example, the reflected wave may correspond to an amount of power that is transmitted from the source resonator 350 to the target resonator 410 and that is not received by the target resonator 410, but is instead reflected. The reflected wave is then detected by the source resonator 350.

The source communicating unit 380 may perform transmission and reception of data, with the target communicating unit 490 included in the resonance power receiver 400. For example, the source communicating unit 380 may receive information associated with a variation in an impedance of a load 401 from the resonance power receiver 400. The source MCU 390 may control the matching-controller 340 to perform impedance-matching based on the information associated with the variation in the impedance of the load 401.

In this example, the source communicating unit 380 includes an in-band communicating unit 381 that may transmit and receive data through the source resonator 350 and an out-band communicating unit 383 that may transmit and receive data through a separate antenna 385. For example, the in-band communicating unit 381 may communicate with an in-band communicating unit 491 of the resonance power receiver 400 through a resonance frequency of the source resonator 350. As another example, the out-band communicating unit 383 may communicate with an out-band communicating unit 493 of the resonance power receiver 400 through an allocated frequency band to communicate with the resonance power receiver 400.

The source MCU 390 may control the matching-controller 340 to perform impedance-matching of the source resonator 350. For example, if a detected reflected-power is greater than a predetermined value, power to be used by the resonance power receiver 400 may have changed, or the load 401 connected to the resonance power receiver 400 may have changed. In this example, when the power to be used by the resonance power receiver 400 changes, the source MCU may control at least one of the AC/AC converter 310, the AC/DC converter 320, the DC/AC converter 330, and the matching-controller 340 to adjust the amount of resonance power that is output from the source resonator 350.

The target resonator 410 may receive resonance power from the resonance power transmitter 300 through a magnetic-coupling with the source resonator 350, which in this example is illustrated by the magnetic-coupling 101 and the magnetic-coupling 103.

The matching-controller 420 may perform impedance-matching between the source resonator 350 and the target resonator 410 and/or may perform impedance-matching between the target resonator 410 and the load 401.

The AC/DC converter 430 may generate a DC signal by rectifying an AC signal that is received by the target resonator 410, from the source resonator 350, and may provide the generated DC signal to the load 401. The AC/DC converter 430 may rectify the resonance power that is received by the target resonator 410 to generate the DC signal.

The DC/DC converter 440 may adjust a signal level of a DC signal that is output from the AC/DC converter 430 and may supply a rated voltage to the load 401

The target MCU 450 may perform various control operations to perform matching of the source-target structure. For example, the target MCU 450 may transmit to the target communicating unit 490, information about a variation in the load 401 that is sensed by the load sensor 460, and may control the target communicating unit 490 to transmit, to the resonance power transmitter 300, the information about the variation in the load 401. In this example, the target MCU 450 may control the matching-controller 420 to match an impedance of the target resonator 410 with an impedance of the load 401.

Various controlling operations for matching of the source-target structure are further described with reference to FIGS. 4 through 6.

The load sensor 460 may detect the impedance of the load 401 and/or a variation in the impedance of the load 401. For example, the load sensor 460 may sense a voltage applied to the load 401 and an amount of current that is flowing through the load 401, from the resonance power receiver. Accordingly, the load sensor 460 may detect the variation in the impedance of the load 401.

The received-power monitoring unit 470 may monitor resonance power that is received from the resonance power receiver 300. For example, the received-power monitoring unit 470 may monitor an amount of resonance power that is received from the resonance power transmitter 300 and a reception condition. The received-power monitoring unit 470 may notify the target MCU 450 of the amount of received resonance power and/or the reception condition.

The reflected-power monitoring unit 480 may monitor reflected-power of the resonance power. For example, the reflected-power monitoring unit 480 may sense the reflected-power by coupling a reflected signal using a coupler (not illustrated). The reflected-power monitoring unit 480 may notify the target MCU 450 of information associated with whether the reflected power is sensed and an amount of the reflected power that is sensed.

The target communicating unit 490 may perform transmission and reception of data with the source communicating unit 380. For example, the target communicating unit 490 may include the in-band communicating unit 491 that may transmit and may receive data through the target resonator 410, and may include the out-band communicating unit 493 that may transmit and may receive data through a separate antenna 495. In this example, the in-band communicating unit 491 may communicate with the in-band communicating unit 381 through a resonance frequency of the target resonator 410. The out-band communicating unit 493 may communicate with the out-band communicating unit 383 through a frequency band that is allocated to communicate with the resonance power transmitter 300.

Figure 4:
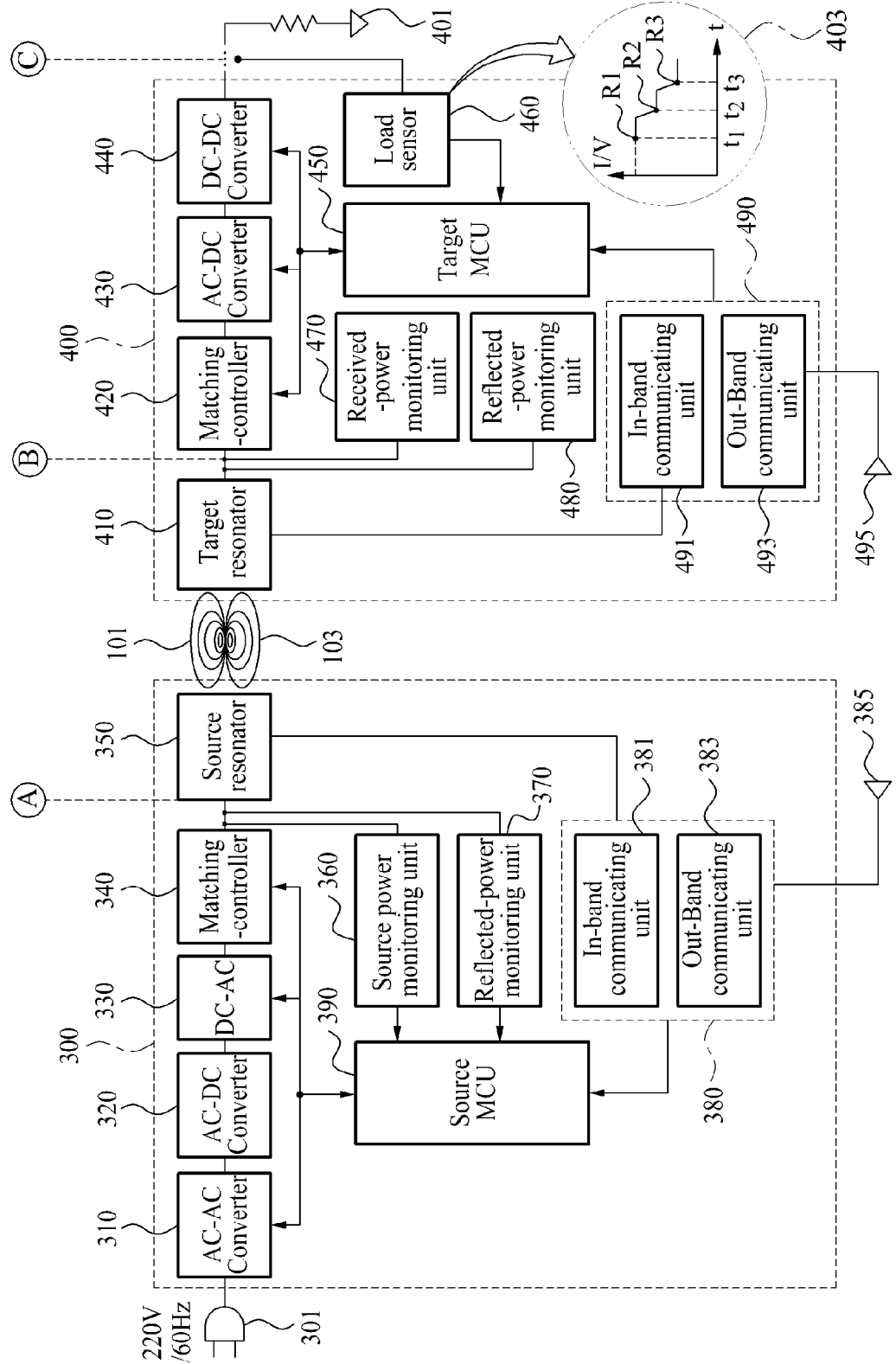

Referring to FIG. 4, impedance-matching may be performed between the source resonator 350 and the target resonator 410, and/or may be performed between the target resonator 410 and the load 401. For example, impedance-matching may be performed between point A and point B and between point B and point C. As an example, the load sensor 460 may sense a variation in impedance according to a variation in a load, through a time-current/voltage curve 403. For example, the variation in impedance may be sensed by detecting current/voltage values R1, R2, and R3 for respective times t1, t2, and t3.

The amount of resonance power transmitted from the resonance power transmitter 300 to the resonance power receiver 400 may vary based on an amount of power that is used or that is to be used by the load 401. Accordingly, the amount of transmitted resonance power may be based on the amount of power used by the load 401. In this example, the target MCU 450 and the source MCU 390 may sense a variation in the amount of power used and/or to be used by the load 401, and may perform impedance-matching based on the variation in the amount of the power. For example, the target MCU 450 may control impedance-matching of the matching-controller 420, based on a table that stores a value of the variation in the impedance corresponding to the variation in the power to be used by the load.

Figure 9:
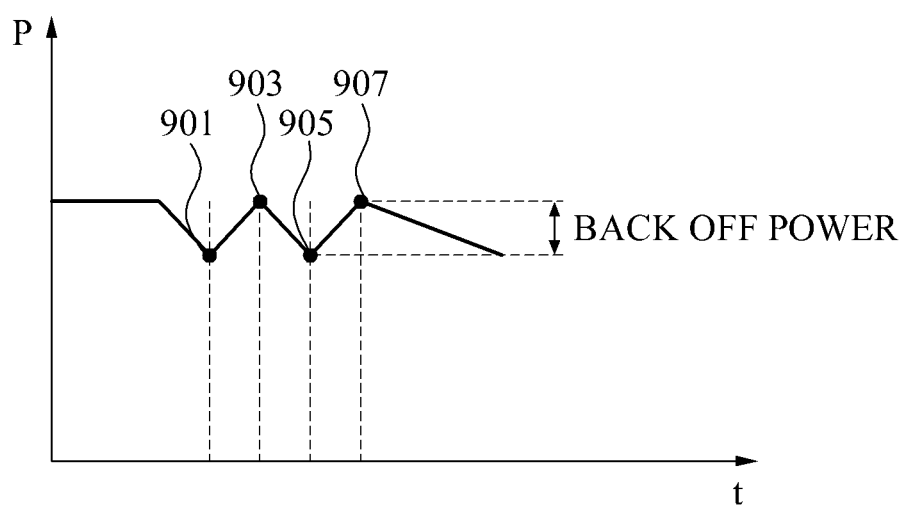
FIG. 9 is a graph illustrating an example of a variation in an amount of power used by a load.

FIG. 9 illustrates a variation in an amount of power to be used by a load.

Referring to FIG. 9, points 901, 903, 905, and 907 indicate points in time in which the amount of power to be used by the load changes. Impedance-matching may be performed at points in time in which the amount of power to be used by the load changes. For example, the impedance-matching of the matching-controller 420 may be controlled based on the table that stores the value of the variation in the impedance corresponding to a charged level of the load.

Figure 10:
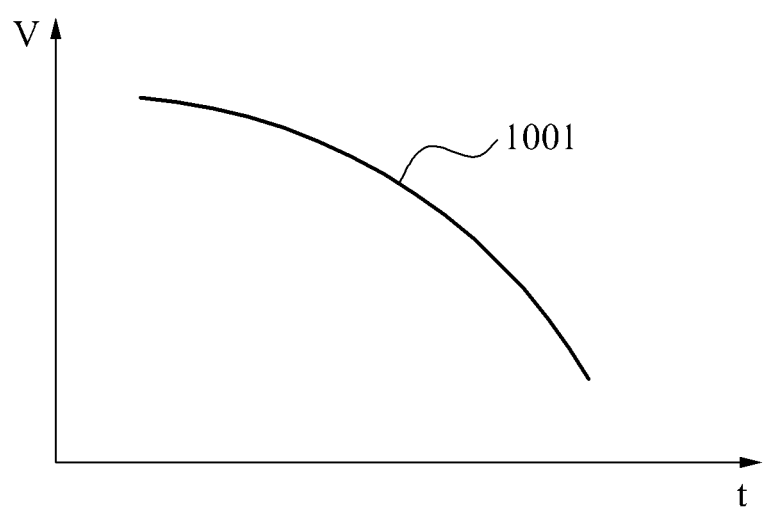
FIG. 10 is a graph illustrating an example of a relation between a time and a voltage applied to a load.

FIG. 10 illustrates an example of a relation between a time and a voltage applied to a load.

Referring to FIG. 10, for example, the load may be more charged over time and a voltage 1001 applied to the load may decrease over time. In this example, impedance-matching may be performed based on a charged level of the load.

Figure 5:
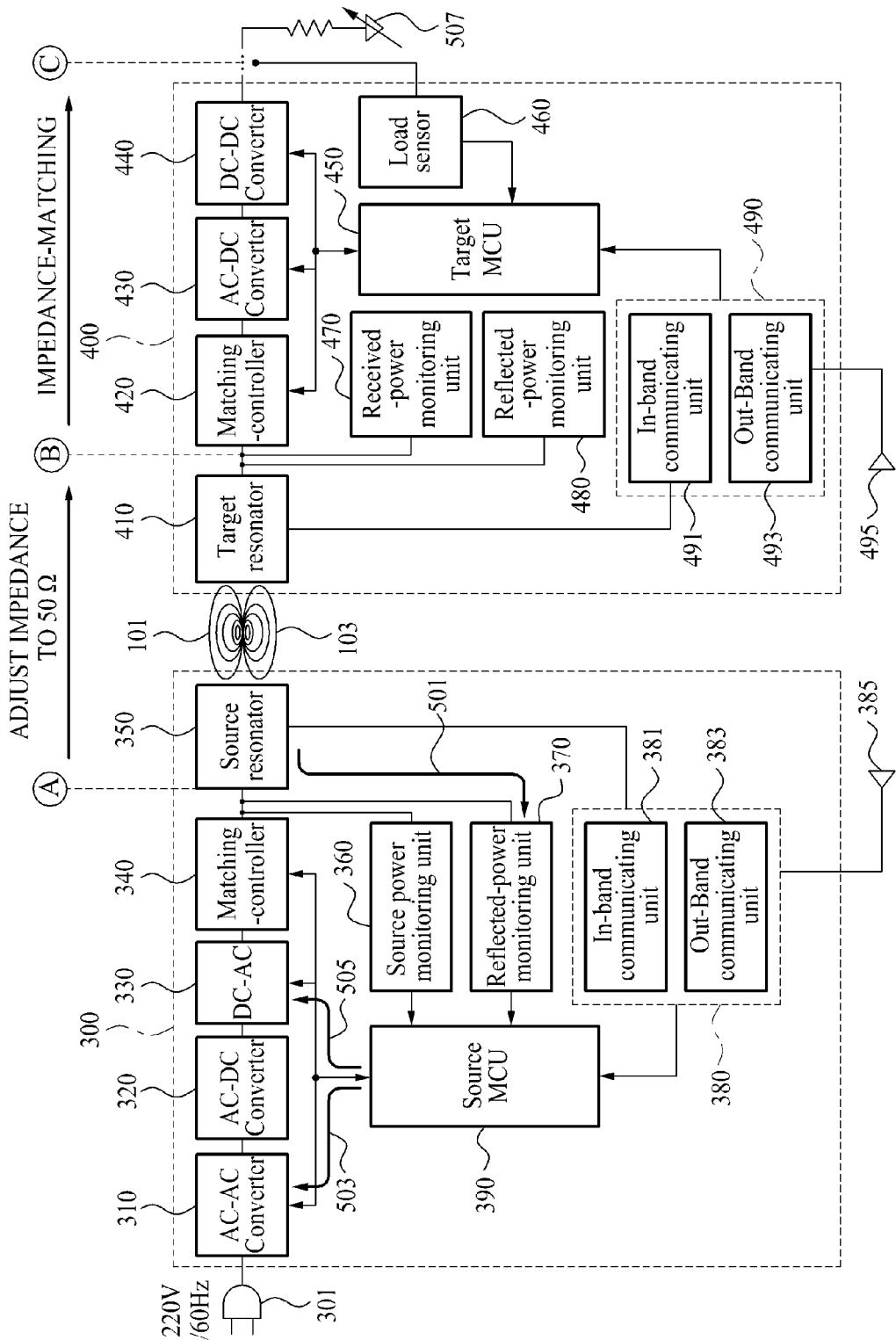

Referring to FIG. 5, impedance mismatching may occur between point A and point B because of a variation in an impedance of a load 507. In response to the impedance mismatching occurring between point A and point B, a power transmission efficiency of the source-target structure may decrease. In this example, if the impedance mismatching occurs between point A and point B, the reflected-power monitoring unit 370 may sense a reflected signal 501. In response to sensing the reflected signal 501, the reflected-power monitoring unit 370 may notify the source MCU 390 that the reflected signal 501 is sensed.

The source MCU 390 may control at least one of the AC/AC converter 310, the AC/DC converter 320, and the DC/AC converter 330 to adjust the amount of resonance power that is output from the source resonator 350. For example, the source MCU 390 may use control signals 503 and 505 to control at least one of the AC/AC converter 310, the AC/DC converter 320, and the DC/AC converter 330. The source MCU 390 may control the matching-controller 340 to perform impedance-matching. As an example, the matching-controller 340 may perform impedance-matching between point A and point B to adjust the impedance to, for example, approximately 50 ohms or to approximately 33 ohms, and the like. For example, the impedance-matching between point A and point B, and impedance-matching between point B and point C may be performed to adjust an impedance of the load 507.

Figure 6:
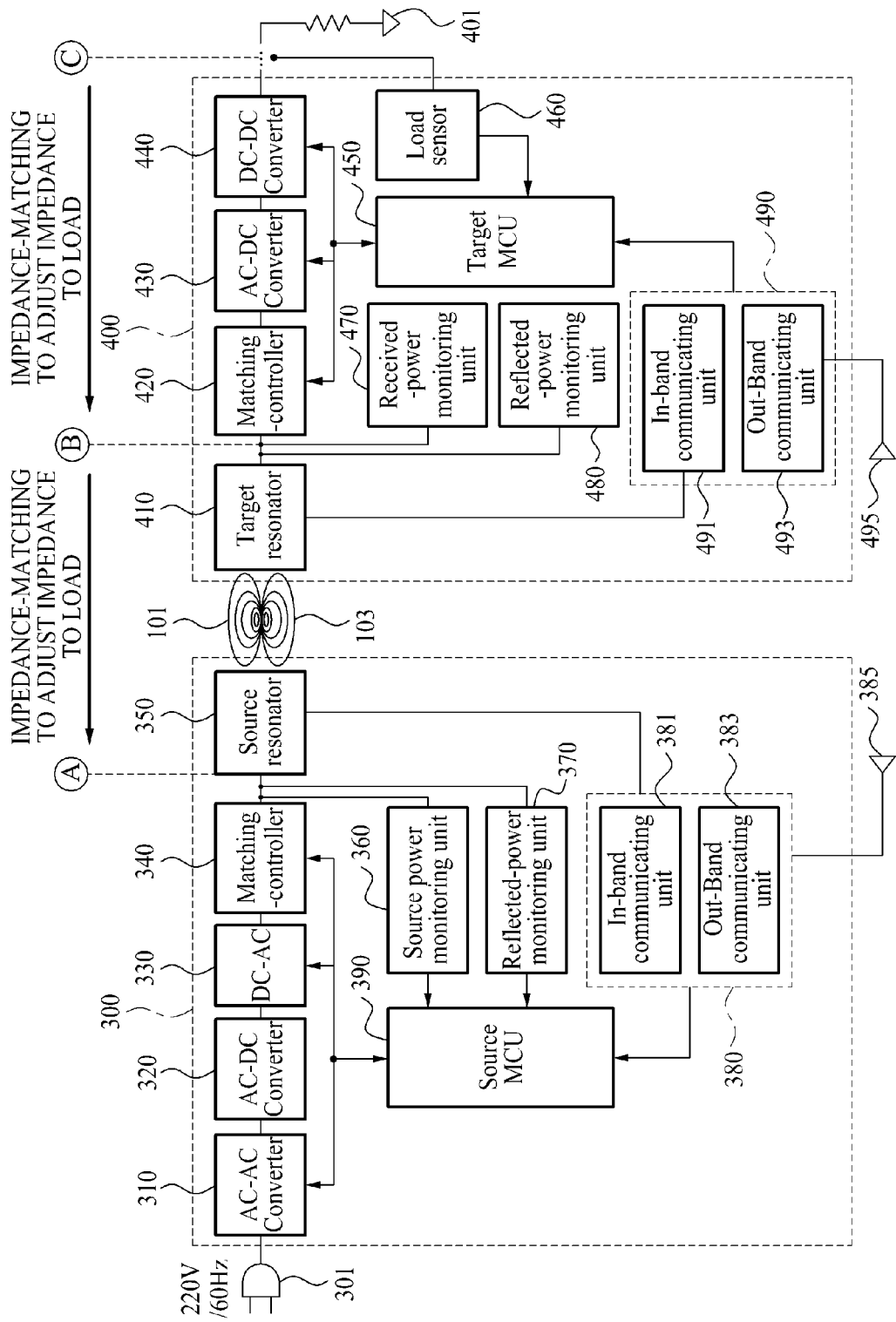

Referring to FIG. 6, impedance-matching between point A and point B, and impedance-matching between point B and point C may be performed to adjust an impedance of the load 401. For example, the load sensor 460 may sense the impedance of the load 401 at a predetermined time T, and the target MCU 450 may transmit the impedance of the load 401 to the matching-controller 420, for example, at the predetermined time T. The matching controller 420 may control an impedance of the target resonator 410 to be the same as the impedance of the load 401. In this example, impedance-matching between point B and point C may be performed. The target MCU 450 may notify the resonance power transmitter 300 of the impedance of the load 401 at the predetermined time T through the target communicating unit 490.

The source MCU 390 may control the matching-controller 340 to perform impedance-matching between point A and point B. For example, the matching-controller 340 may control an impedance of the source resonator 350 to be the same as the impedance of the load 401 that is sensed by the resonance power receiver 400, through controlling of the source MCU 390. As an example, the impedance of the load 401 may have a value that is between approximately 10 ohms and 100 ohms. That is, impedance-matching between point A and point B, and the impedance-matching between point B and point C may be a value that is between, for example, approximately 10 ohms and 100 ohms.

Figure 7:
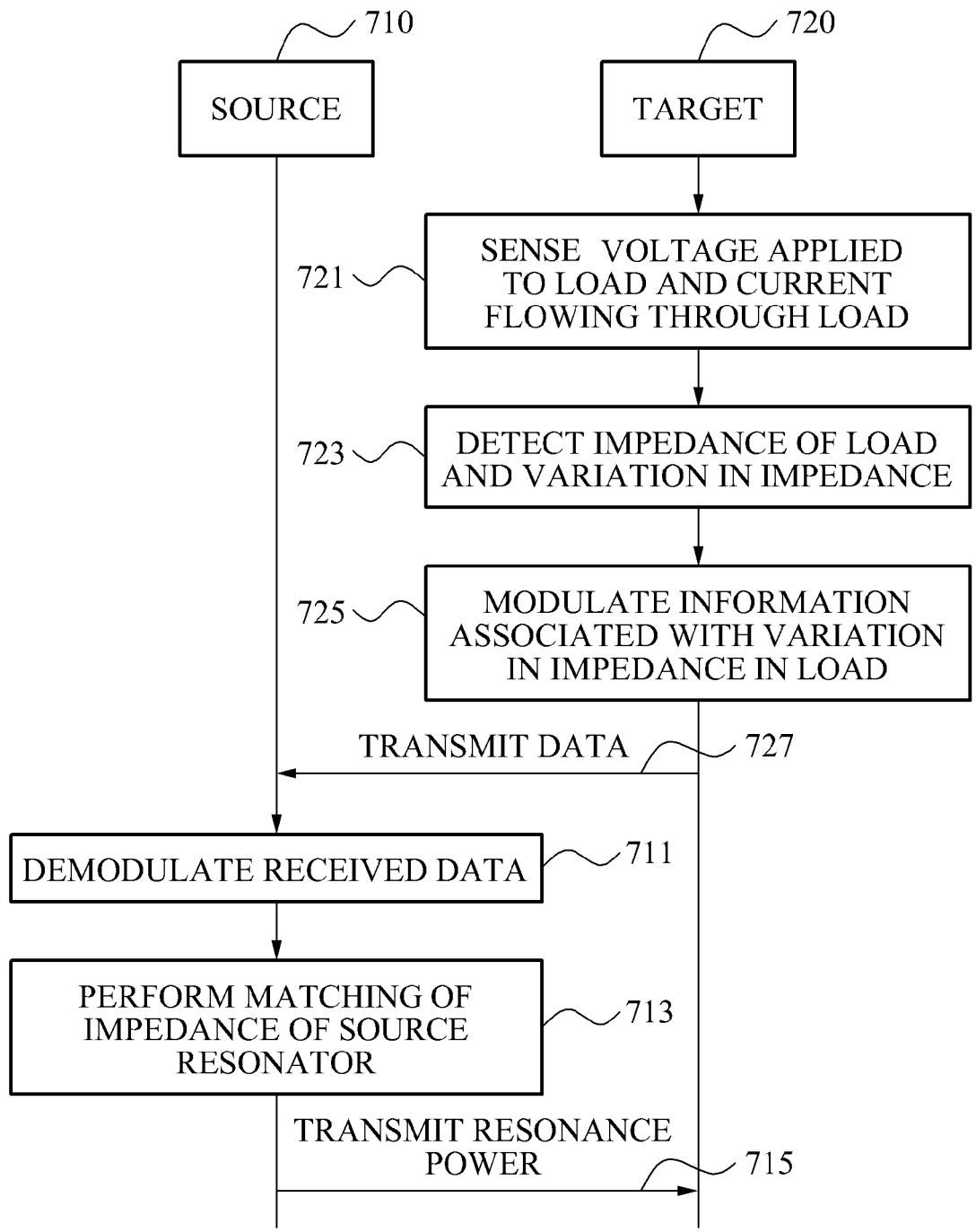
FIG. 7 is a diagram illustrating an example of controlling the matching of a source-target structure that transmits and receives resonance power.

FIG. 7 illustrates an example of controlling the matching of a source-target structure that transmits and receives resonance power.

Referring to FIG. 7, target 720 corresponds to a resonance power receiver. In 721, the resonance power receiver senses a voltage applied to a load and a current flowing through the load. In 721, the resonance power receiver may sense the voltage and the current supplied to the load. In this example, the load may be a load of a device that is electrically connected to the resonance power receiver or a load of the resonance power receiver itself. A load may be connected to the resonance power receiver through a wired connection or over a wireless connection.

In 723, the resonance power receiver detects an impedance of the load and a variation in the impedance. For example, the variation in the impedance may be detected based on the voltage and the current that are sensed in 721. As an example, the variation in the impedance of the load may be detected by comparing an impedance value at a current time T and an impedance value at a time T−1. As another example, the variation in the impedance may be detected by sensing the voltage applied to the load and an amount of current flowing through the load.

The resonance power receiver modulates information associated with the variation in the impedance of the load, in 725, and transmits modulated data to a source 710, in 727. The information associated with the variation in the impedance may include an amount of the variation in the impedance. As another example, the information associated with the variation in the impedance may include a signal that indicates that the variation in the impedance of the load exceeds a threshold.

In this example, the source 710 corresponds to a resonance power transmitter. The resonance power receiver may transmit, to the resonance power transmitter, the information that is associated with the variation in the impedance of the load and information that is associated with an identification of the resonance power receiver. For example, the resonance power transmitter may recognize that the target 720 is located in a resonance power transmission coverage, based on the information that is associated with the identification.

In 711, the resonance power transmitter demodulates the data received from the target 720. In 713, the resonance power transmitter performs impedance-matching of a source resonator based on the information associated with the variation in the impedance of the load. In 715, the resonance power is transmitted from the source 710 to the target 720.

In various aspects, resonance power corresponding to the variation in the impedance may be received from the resonance power transmitter. In this example, the resonance power corresponding to the variation in the impedance may be resonance power that is transmitted after impedance-matching is performed while factoring in the variation in the impedance of the load.

Figure 8:
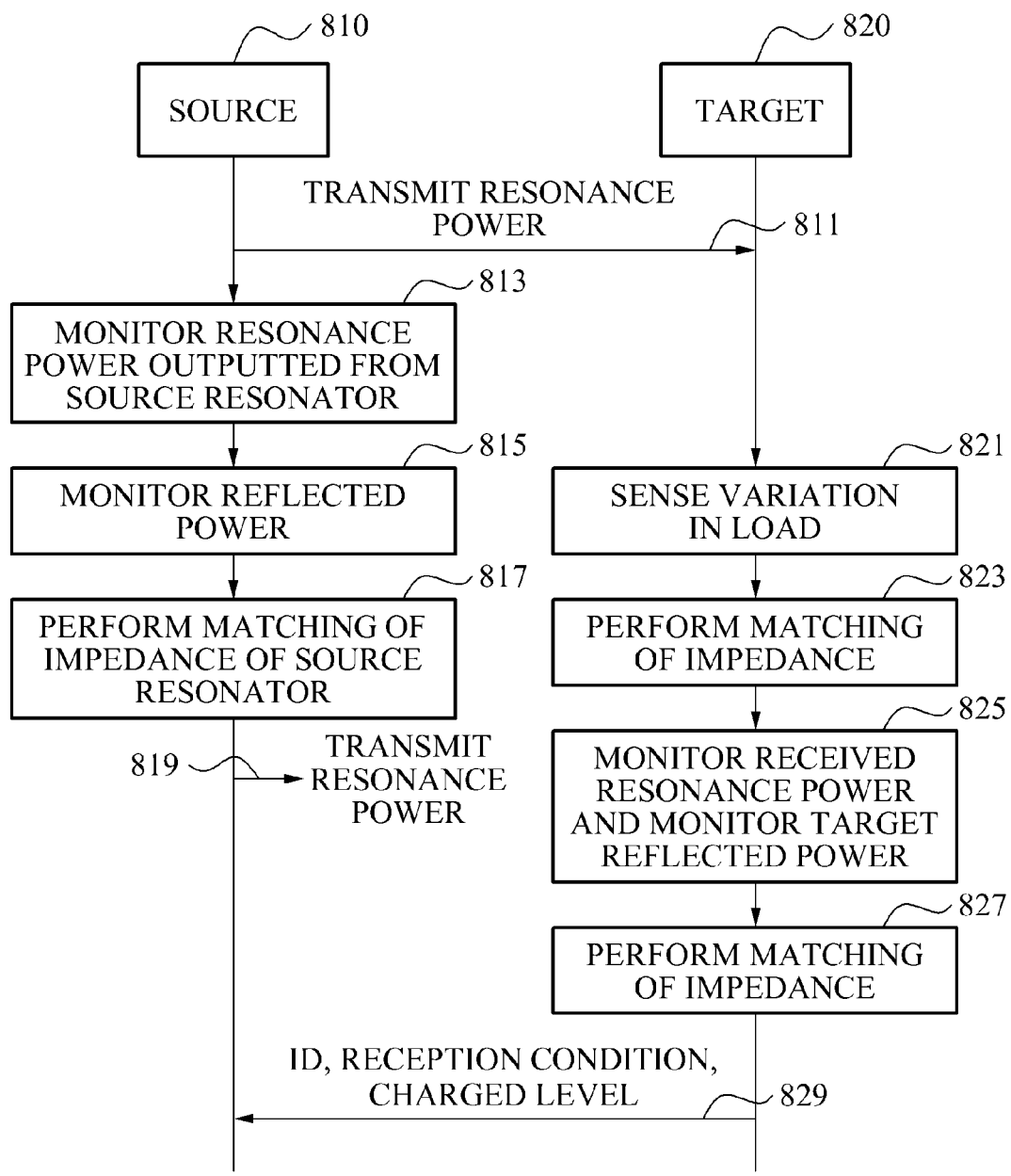
FIG. 8 is a diagram illustrating another example of controlling the matching of a source-target structure that transmits and receives resonance power.

FIG. 8 illustrates another example of controlling the matching of a source-target structure that transmits and receives resonance power.

In FIG. 8, source 810 corresponds to a resonance power transmitter and target 820 corresponds to a resonance power receiver.

In 811, the source 810 transmits resonance power to the target 820 through a source resonator. The target 820 may receive the resonance power through a target resonator in 811.

In 813, the source 810 monitors the resonance power that is output from the source resonator. For example, when the resonance power transmission begins, the source 810 may periodically measure an amount of resonance power that is output from the source resonator, or may monitor whether the resonance power is transmitted normally.

In 815, the source 810 monitors a reflected-power of the resonance power that is output from the source resonator. In this example, operations 813 and 815 may be performed simultaneously or at different times. In response to reflected-power being received, it is determined that impedance mismatching has occurred.

In response to the reflected-power being sensed, the source 810 performs impedance-matching of the source resonator, in 817. Although not illustrated, as another example, the source 810 may perform impedance-matching of the source resonator when a variation in an amount of power to be used by the resonance power receiver is sensed through communication with the target 820.

After the impedance-matching is performed, the source 810 transmits the resonance power corresponding to a variation in the impedance, in 819.

The target 820 senses a variation in a load in 821, and if the variation in the impedance of the load occurs, the target 820 performs the impedance-matching between the target resonator and the load, in 823.

In 825, the target 820 monitors the received resonance power and monitors a target reflected power that corresponds to the resonance power that is received through the target resonator in 825.

Operations 825 through 827 may be similar to operations 815 through 817. For example, if the target 820 senses the target reflected power corresponding to the resonance power or senses a variation in power to be used by the load, the target 820 may perform impedance-matching between the target resonator and the load.

In 829, the target 820 transmits, to the source 810, information, for example, identification (ID), a resonance power reception condition, a charged level, and the like. For example, operation 829 may be periodically performed. In this example, the source 810 may recognize that the target 820 is located in a resonance power transmission coverage. The source 810 may control power based on the charged level of the target 810.

Figure 11:
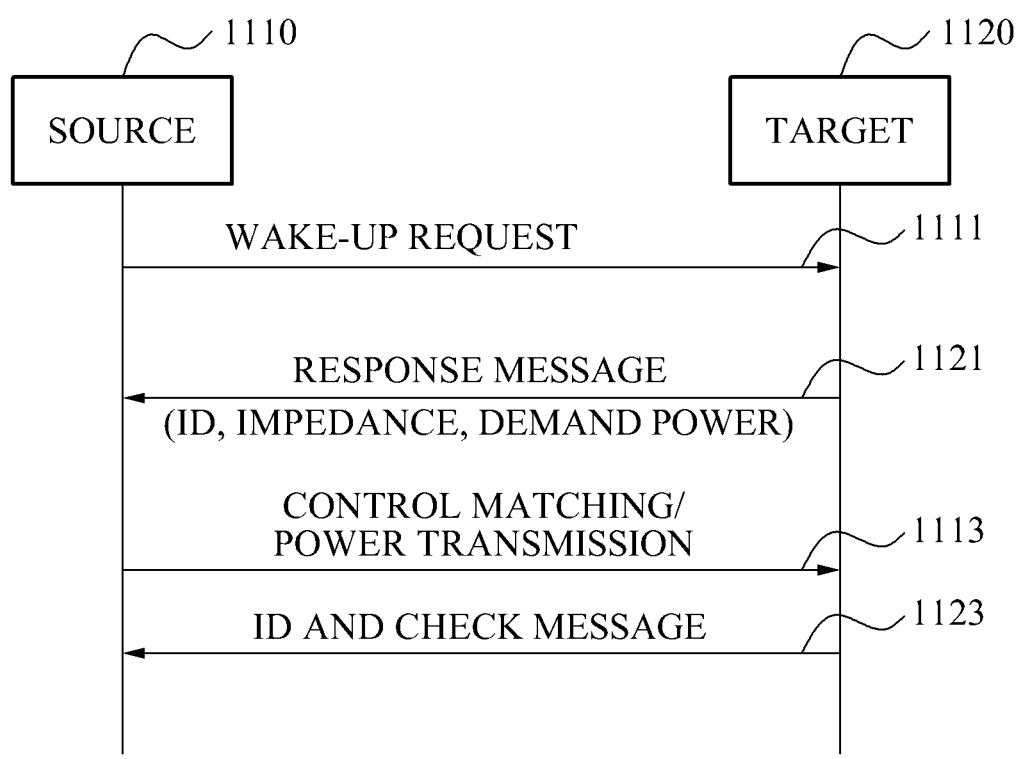
FIG. 11 is a diagram illustrating an example of operations of a source-target structure.

FIG. 11 illustrates an example of operations of a source-target structure.

Referring to FIG. 11, a source 1110 transmits a wake-up request signal to wake-up a target 1120, in 1111. For example, the wake-up request signal may be a signal to detect a device that is operating with the same resonance frequency as the source 1110. For example, the wake-up request signal may include power to be used for converting the target 1120 into a reception mode. As an example, the wake-up request signal may be transmitted in a form of a 20 MHz continuous wave (CW). In this example, a CW may include, for example, power, an amount of the power being the same as an amount used for activating a processor included in the target 1120, and modulating a message.

In 1121, the source 1110 receives a response message from the target 1120 that is activated by the wake-up request signal. In this example, the response message may include, for example, an ID of the target 1120, an impedance of a load connected to the target 1120, and information associated with power to be used by the target 1120.

If the response message is not received within a predetermined time, the source 1110 may periodically transmit the wake-up request signal, and thus, may sense whether a device exists in the vicinity of the source 1110.

In 1113, the source 1110 sets a demand power based on the response message, and transmits the resonance power to the target 1120 based on the set demand power. Operation 1113 may include, for example, demodulating of the response message, determining, based on the demodulated response message, a current and voltage of the target 1120 to be used, and setting the demand power based on the current and voltage to be used. For example, the source 1110 may set the demand power based on power control data that is received from the target 1120, and may transmit the same amount of power as an amount of the demand power to the target 1120. When the impedance-matching occurs after the power transmission is started, the source 1110 may perform matching-controlling as described with reference to FIGS. 7 and 8.

In 1123, the target 1120 periodically transmits, to the source 1110, a check message including the ID of the target 1120 and power reception condition. For example, the target 1120 may transmit the ID to the source 1110 periodically or in real time. The source 110 may receive the ID of the target 1120 periodically or in real time and may recognize that the target 1110 exists. The target 1120 may notify the source 1110 of the power reception condition periodically or in real time. For example, the power reception condition may include at least one of a charged level of battery, whether power is on or off, an amount of reflected power, coupling information, consumption power information, and the like.

According to various aspects, power loss due to changing factors, for example, a variation in the consumption power, a variation in a resonance coupling condition, a variation in an impedance, and a variation in location of a resonance period, may be reduced.

In various aspects, the source resonator and/or a target resonator may be configured as a helix coil structured resonator, a spiral coil structured resonator, a meta-structured resonator, and the like.

All materials have a unique magnetic permeability (Mµ), and a unique permittivity epsilon (∈). The magnetic permeability indicates a ratio between a magnetic flux density that occurs with respect to a given magnetic field in a corresponding material and a magnetic flux density that occurs with respect to the given magnetic field in a vacuum state. The magnetic permeability and the permittivity may determine a propagation constant of a corresponding material at a given frequency or at a given wavelength. An electromagnetic characteristic of the corresponding material may be determined based on the magnetic permeability and the permittivity.

For example, a material that has a magnetic permeability or a permittivity absent in nature and artificially designed is referred to as a metamaterial. The metamaterial may be easily disposed in a resonance state even in a relatively large wavelength area or a relatively low frequency area. For example, even though a material size rarely varies, the metamaterial may be easily disposed in the resonance state.

Figure 12:
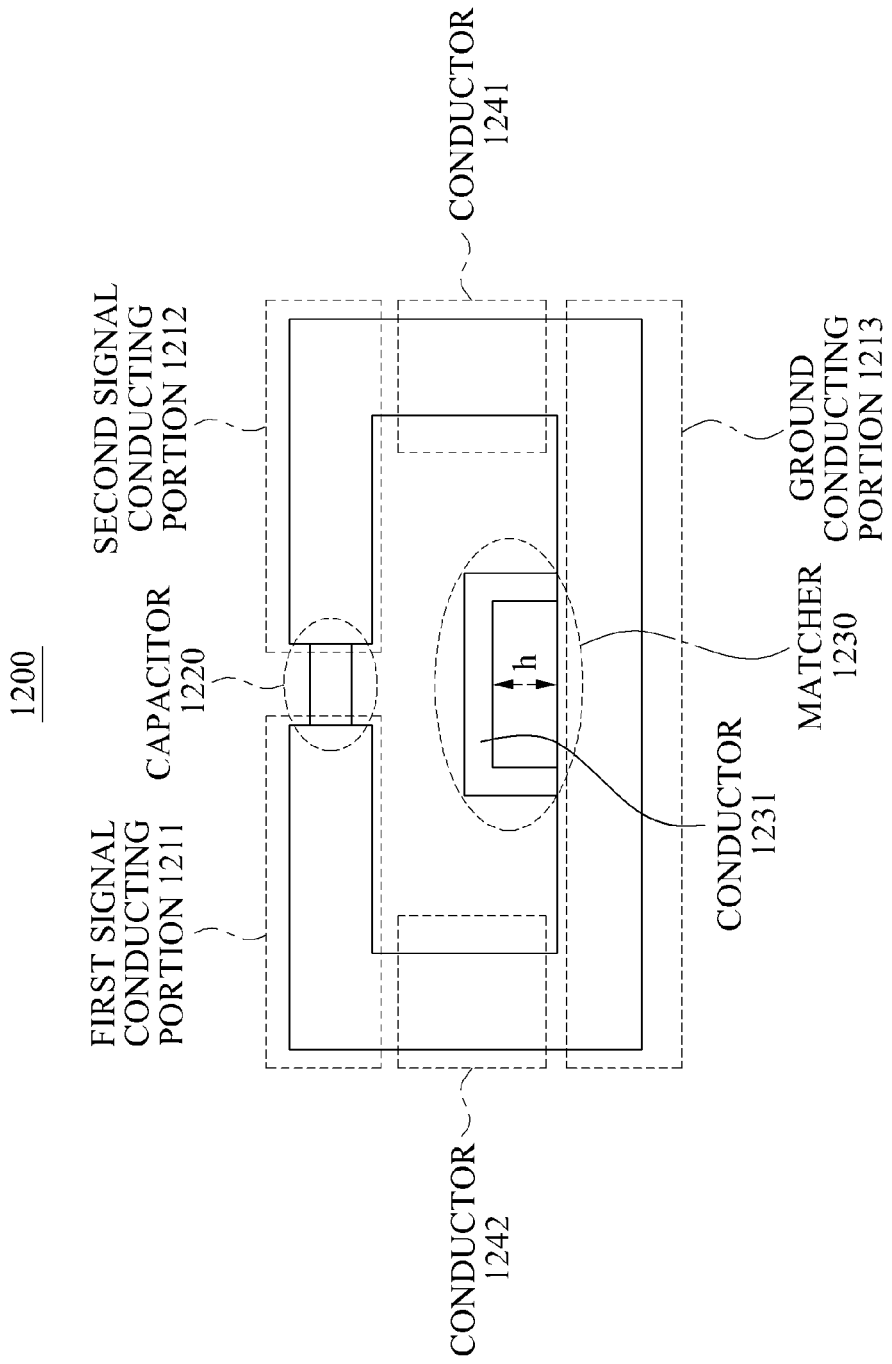
FIGS. 12 through 18 are diagrams illustrating examples of resonator structures.

FIG. 12 illustrates a two-dimensional (2D) illustration of a resonator.

Referring to FIG. 12, resonator 1200 includes a transmission line, a capacitor 1220, a matcher 1230, and conductors 1241 and 1242. In this example, the transmission line includes a first signal conducting portion 1211, a second signal conducting portion 1212, and a ground conducting portion 1213.

For example, the capacitor 1220 may be inserted in series between the first signal conducting portion 1211 and the second signal conducting portion 1212, and an electric field may be confined within the capacitor 1220. For example, the transmission line may include at least one conductor in an upper portion of the transmission line, and at least one conductor in a lower portion of the transmission line. Current may flow through the at least one conductor disposed in the upper portion of the transmission line, and the at least one conductor disposed in the lower portion of the transmission line may be electrically grounded.

In this example, a conductor disposed in an upper portion of the transmission line is referred to as the first signal conducting portion 1211 and the second signal conducting portion 1212. A conductor disposed in the lower portion of the transmission line is referred to as the ground conducting portion 1213.

The transmission line may include the first signal conducting portion 1211 and the second signal conducting portion 1212 in the upper portion of the transmission line, and may include the ground conducting portion 1213 in the lower portion of the transmission line. The first signal conducting portion 1211 and the second signal conducting portion 1212 may be disposed such that they face the ground conducting portion 1213. Current may flow through the first signal conducting portion 1211 and the second signal conducting portion 1212.

In this example, one end of the first signal conducting portion 1211 may be shorted to a conductor 1242, and another end of the first signal conducting portion 1211 may be connected to the capacitor 1220. One end of the second signal conducting portion 1212 may be grounded to the conductor 1241, and another end of the second signal conducting portion 1212 may be connected to the capacitor 1220. In this example, the first signal conducting portion 1211, the second signal conducting portion 1212, the ground conducting portion 1213, and the conductors 1241 and 1242 may be connected to each other such that the resonator 1200 has the structure of an electrically closed-loop. The structure of the loop may include a polygonal structure, for example, a circular structure, a rectangular structure, and the like. An electrically closed-loop indicates a circuit that is electrically closed.

The capacitor 1220 may be inserted into an intermediate portion of the transmission line. For example, the capacitor 1220 may be inserted into a space between the first signal conducting portion 1211 and the second signal conducting portion 1212. In various aspect, the capacitor 1220 may have a shape of, for example, a lumped element, a distributed element, and the like. For example, a distributed capacitor that has the shape of the distributed element may include zigzagged conductor lines and a dielectric material that has a relatively high permittivity between the zigzagged conductor lines.

When the capacitor 1220 is inserted into the transmission line, the resonator 1200 may have a property of a metamaterial. The metamaterial indicates a material that has a predetermined electrical property that is absent in nature and has an artificial design. An electromagnetic characteristic of materials that exist in nature may have a unique magnetic permeability or a unique permittivity. Most materials may have a positive magnetic permeability or a positive permittivity. In the case of most materials, a right hand rule may be applied to an electric field, a magnetic field, and a pointing vector and thus, the corresponding materials may be referred to as right handed materials (RHMs).

However, a metamaterial has a magnetic permeability or a permittivity that is absent in nature. Accordingly, the metamaterial may be classified into, for example, an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the capacitor inserted as the lumped element is appropriately determined, the resonator 1200 may have the characteristic of the metamaterial. Because the resonator 1200 may have a negative magnetic permeability by adjusting the capacitance of the capacitor 1220, the resonator 1200 may also be referred to as an MNG resonator. Various criteria may be applied to determine the capacitance of the capacitor 1220. For example, the various criteria may include enabling the resonator 1200 to have the characteristic of the metamaterial, enabling the resonator 1200 to have a negative magnetic permeability in a target frequency, enabling the resonator 1200 to have a zeroth order resonance characteristic in the target frequency, and the like. Based on at least one criterion, the capacitance of the capacitor 1220 may be determined.

The resonator 1200, also referred to as the MNG resonator 1200, may have a zeroth order resonance characteristic that has, as a resonance frequency, a frequency in which a propagation constant is zero. For example, a zeroth order resonance characteristic may be a frequency transmitted through a line or medium that has a propagation constant of zero. Because the resonator 1200 may have the zeroth order resonance characteristic, the resonance frequency may be independent with respect to a physical size of the MNG resonator 1200. Therefore, by appropriately designing the capacitor 1220, the MNG resonator 1200 may sufficiently change the resonance frequency. Accordingly, the physical size of the MNG resonator 1200 may not be changed.

In a near field, the electric field may be concentrated on the capacitor 1220 that is inserted into the transmission line. Accordingly, due to the capacitor 1220, the magnetic field may become dominant in the near field. In this example, the MNG resonator 1200 may have a relatively high Q-factor using the capacitor 1220 of the lumped element. Accordingly, it is possible to enhance power transmission efficiency. In this example, the Q-factor indicates a level of an ohmic loss or a ratio of a reactance with respect to a resistance in the wireless power transmission. It should be understood that the efficiency of the wireless power transmission may increase according to an increase in the Q-factor.

The MNG resonator 1200 may include the matcher 1230 for impedance-matching. The matcher 1230 may adjust a strength of a magnetic field of the MNG resonator 1200. An impedance of the MNG resonator 1200 may be determined by the matcher 1230. Current may flow into and/or out of the MNG resonator 1200 via a connector. The connector may be connected to the ground conducting portion 1213 or the matcher 1230. For example, power may be transferred through coupling between the connector and the ground conducting portion 1213 or the matcher 1230, without using a physical connection.

For example, as shown in FIG. 12, the matcher 1230 may be positioned within the loop formed by the loop structure of the resonator 1200. The matcher 1230 may adjust the impedance of the resonator 1200 by changing the physical shape of the matcher 1230. For example, the matcher 1230 may include the conductor 1231 for impedance-matching in a location that is separated from the ground conducting portion 1213 by a distance h. The impedance of the resonator 1200 may be changed by adjusting the distance h.

Although not illustrated in FIG. 12, a controller may be provided to control the matcher 1230. In this example, the matcher 1230 may change the physical shape of the matcher 1230 based on a control signal that is generated by the controller. For example, the distance h between a conductor 1231 of the matcher 1230 and the ground conducting portion 1213 may be increased or decreased based on the control signal. Accordingly, the physical shape of the matcher 1230 may be changed and the impedance of the resonator 1200 may be adjusted. The controller may generate the control signal based on various factors, which are described later.

As shown in FIG. 12, the matcher 1230 may be a passive element such as the conductor 1231. As another example, the matcher 1230 may be an active element such as a diode, a transistor, and the like. When the active element is included in the matcher 1230, the active element may be driven based on the control signal that is generated by the controller, and the impedance of the resonator 1200 may be adjusted based on the control signal. For example, a diode that is an active element may be included in the matcher 1230. The impedance of the resonator 1200 may be adjusted based on whether the diode is in an on state or in an off state.

Although not illustrated in FIG. 12, a magnetic core may pass through the MNG resonator 1200. The magnetic core may increase a power transmission distance.

Figure 13:
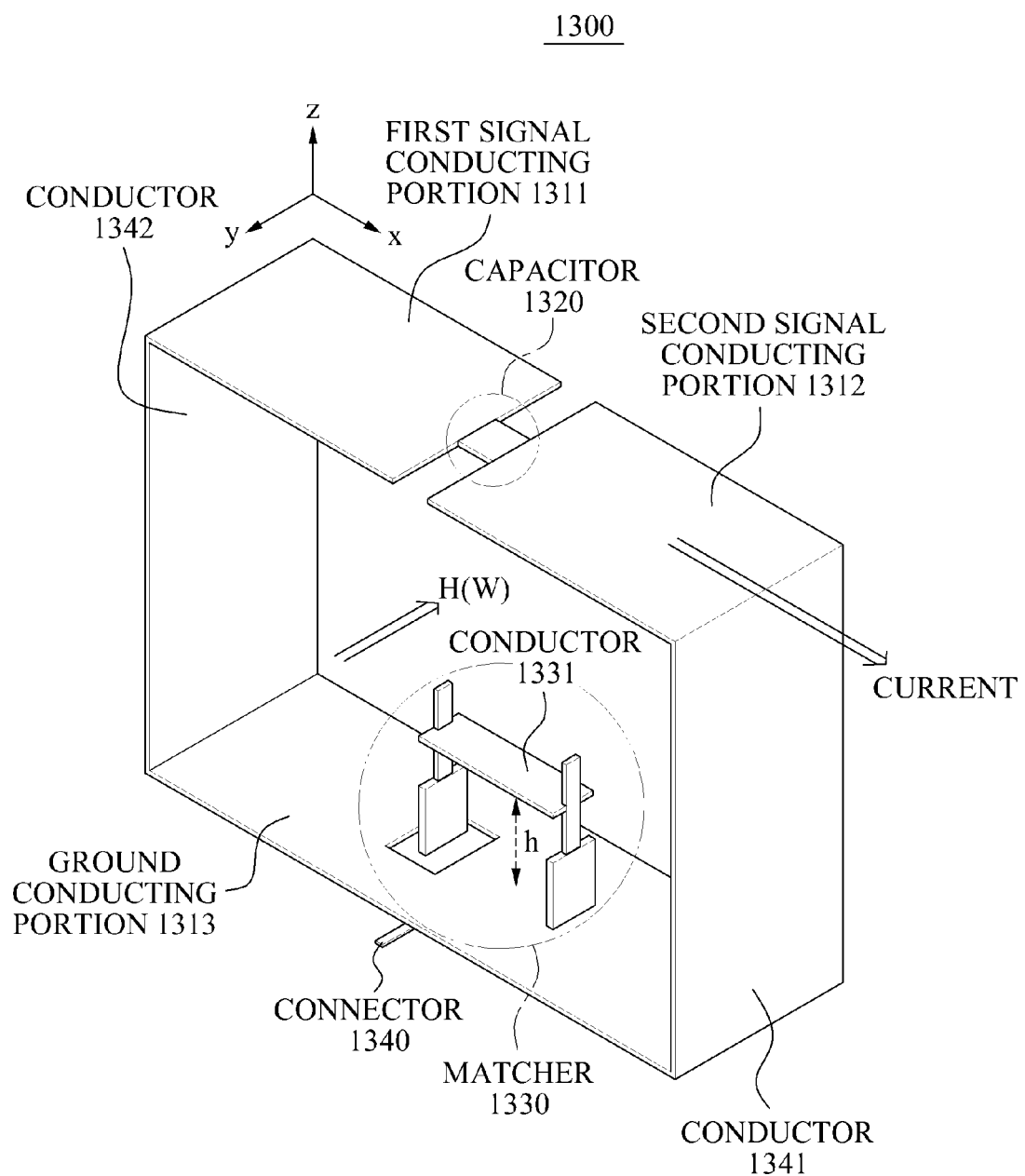

FIG. 13 illustrates a three-dimensional (3D) illustration of a resonator.

Referring to FIG. 13, resonator 1300 includes a transmission line and a capacitor 1320. In this example, the transmission line includes a first signal conducting portion 1311, a second signal conducting portion 1312, and a ground conducting portion 1313. As an example, the capacitor 1320 may be inserted in series between the first signal conducting portion 1311 and the second signal conducting portion 1312 of the transmission line such that an electric field is confined within the capacitor 1320.

In this example, the transmission line includes the first signal conducting portion 1311 and the second signal conducting portion 1312 in an upper portion of the resonator 1300, and includes the ground conducting portion 1313 in a lower portion of the resonator 1300. The first signal conducting portion 1311 and the second signal conducting portion 1312 may be disposed such that they face the ground conducting portion 1313. Current may flow in an x direction through the first signal conducting portion 1311 and the second signal conducting portion 1312. A magnetic field H(W) may be formed in a −y direction as a result of the current. As another example, unlike the diagram of FIG. 13, the magnetic field H(W) may be formed in a +y direction.

In this example, one end of the first signal conducting portion 1311 is shorted to a conductor 1342, and another end of the first signal conducting portion 1311 is connected to the capacitor 1320. One end of the second signal conducting portion 1312 is grounded to the conductor 1341, and another end of the second signal conducting portion 1312 is connected to the capacitor 1320. Accordingly, the first signal conducting portion 1311, the second signal conducting portion 1312, the ground conducting portion 1313, and the conductors 1341 and 1342 are connected to each other such that the resonator 1300 has the structure of an electrically closed-loop.

As shown in FIG. 13, the capacitor 1320 is inserted between the first signal conducting portion 1311 and the second signal conducting portion 1312. For example, the capacitor 1320 may be inserted into a space between the first signal conducting portion 1311 and the second signal conducting portion 1312. The capacitor 1320 may have various shapes for example, a shape of a lumped element, a distributed element, and the like. For example, a distributed capacitor that has the shape of the distributed element may include zigzagged conductor lines and a dielectric material that has a relatively high permittivity between the zigzagged conductor lines.

As the capacitor 1320 is inserted into the transmission line, the resonator 1300 may have a property of a metamaterial.

When a capacitance of the capacitor inserted as the lumped element is appropriately determined, the resonator 1300 may have the characteristic of the metamaterial. Because the resonator 1300 may have a negative magnetic permeability by adjusting the capacitance of the capacitor 1320, the resonator 1300 may also be referred to as an MNG resonator. Various criteria may be applied to determine the capacitance of the capacitor 1320. For example, the various criteria may include enabling the resonator 1300 to have the characteristic of the metamaterial, enabling the resonator 1300 to have a negative magnetic permeability in a target frequency, enabling the resonator 1300 to have a zeroth order resonance characteristic in the target frequency, and the like. Based on at least one criterion, the capacitance of the capacitor 1320 may be determined.

The resonator 1300, also referred to as the MNG resonator 1300, may have a zeroth order resonance characteristic that has, as a resonance frequency, a frequency when a propagation constant is "0". Because the resonator 1300 may have the zeroth order resonance characteristic, the resonance frequency may be independent with respect to a physical size of the MNG resonator 1300. By appropriately designing the capacitor 1320, the MNG resonator 1300 may sufficiently change the resonance frequency. Accordingly, the physical size of the MNG resonator 1300 may not be changed.

Referring to the MNG resonator 1300 of FIG. 13, in a near field, the electric field may be concentrated on the capacitor 1320 that is inserted into the transmission line. Accordingly, due to the capacitor 1320, the magnetic field may become dominant in the near field. For example, because the MNG resonator 1300 having the zeroth-order resonance characteristic may have characteristics that are similar to a magnetic dipole, the magnetic field may become dominant in the near field. In this example, a relatively small amount of the electric field formed due to the insertion of the capacitor 1320 may be concentrated on the capacitor 1320 causing the magnetic field to become further dominant.

In various aspects, the MNG resonator 1300 may include a matcher 1330 for impedance-matching. The matcher 1330 may adjust the strength of magnetic field of the MNG resonator 1300. In this example, an impedance of the MNG resonator 1300 may be determined by the matcher 1330. Current may flow into and/or out of the MNG resonator 1300 via a connector 1340. The connector 1340 may be connected to the ground conducting portion 1313 or the matcher 1330.

For example, as shown in FIG. 13, the matcher 1330 may be positioned within the loop formed by the loop structure of the resonator 1300. As an example, the matcher 1330 may adjust the impedance of the resonator 1300 by changing the physical shape of the matcher 1330. For example, the matcher 1330 may include the conductor 1331 for the impedance-matching in a location that is separated from the ground conducting portion 1313 by a distance h. In this example, the impedance of the resonator 1300 may be changed by adjusting the distance h.

Although not illustrated in FIG. 13, a controller may be provided to control the matcher 1330. In this example, the matcher 1330 may change the physical shape of the matcher 1330 based on a control signal generated by the controller. For example, the distance h between the conductor 1331 of the matcher 1330 and the ground conducting portion 1313 may be increased or decreased based on the control signal. Accordingly, the physical shape of the matcher 1330 may be changed and the impedance of the resonator 1300 may be adjusted. The distance h between the conductor 1331 of the matcher 1330 and the ground conducting portion 1313 may be adjusted using a variety of schemes. As one example, a plurality of conductors may be included in the matcher 1330 and the distance h may be adjusted by adaptively activating one or more of the conductors. As another example, the distance h may be adjusted by adjusting the physical location of the conductor 1331 such as adjusting the location up and down. The distance h may be controlled based on the control signal of the controller. The controller may generate the control signal using various factors.

As shown in FIG. 13, the matcher 1330 may be a passive element such as the conductor 1331. As another example, the matcher 1330 may be an active element such as a diode, a transistor, and the like. When the active element is included in the matcher 1330, the active element may be driven based on the control signal generated by the controller, and the impedance of the resonator 1300 may be adjusted based on the control signal. For example, a diode that is an active element may be included in the matcher 1330. The impedance of the resonator 1300 may be adjusted based on whether the diode is in an on state or in an off state.

Although not illustrated in FIG. 13, a magnetic core may pass through the resonator 1300 configured as the MNG resonator. The magnetic core may increase a power transmission distance.

Figure 14:
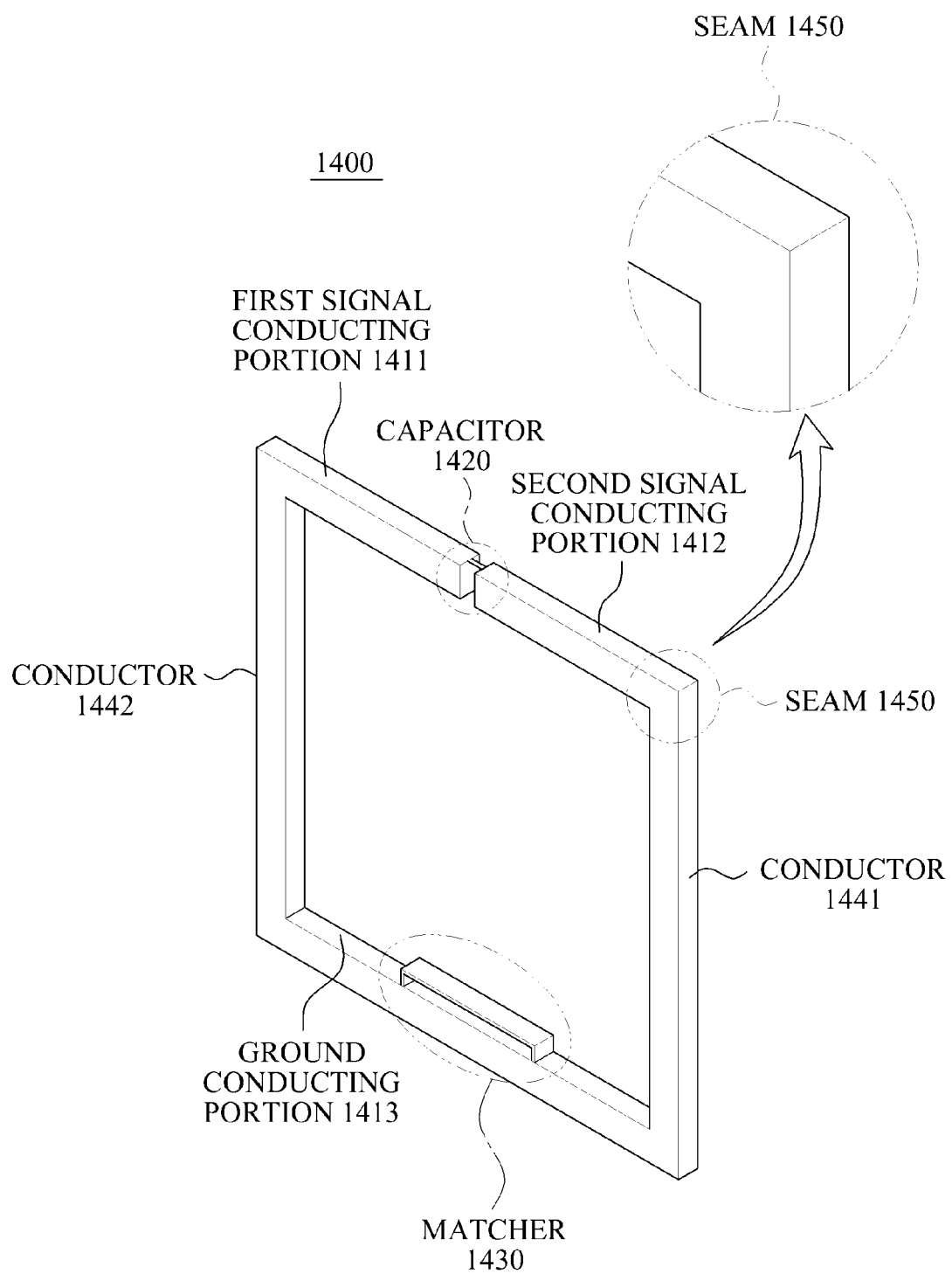

FIG. 14 illustrates an example of a resonator for wireless power transmission configured as a bulky type.

Referring to FIG. 14, resonator 1400 includes a first signal conducting portion 1411 and a second signal conducting portion 1412 which are integrally formed instead of being separately manufactured and subsequently connected to each other. Similarly, the second signal conducting portion 1412 and a conductor 1441 may also be integrally manufactured.

When the second signal conducting portion 1412 and the conductor 1441 are separately manufactured and then are connected to each other, a loss of conduction may occur because of a seam 1450. To overcome this, the second signal conducting portion 1412 and the conductor 1441 may be seamlessly connected to each other. Accordingly, it is possible to decrease a conductor loss caused by the seam 1450. As an example, the second signal conducting portion 1412 and a ground conducting portion 1413 may be seamlessly and integrally manufactured. As another example, the first signal conducting portion 1411 and the ground conducting portion 1413 may be seamlessly and integrally manufactured.

Referring to FIG. 14, a type of a seamless connection connecting at least two partitions into an integrated form is referred to as a bulky type.

Figure 15:
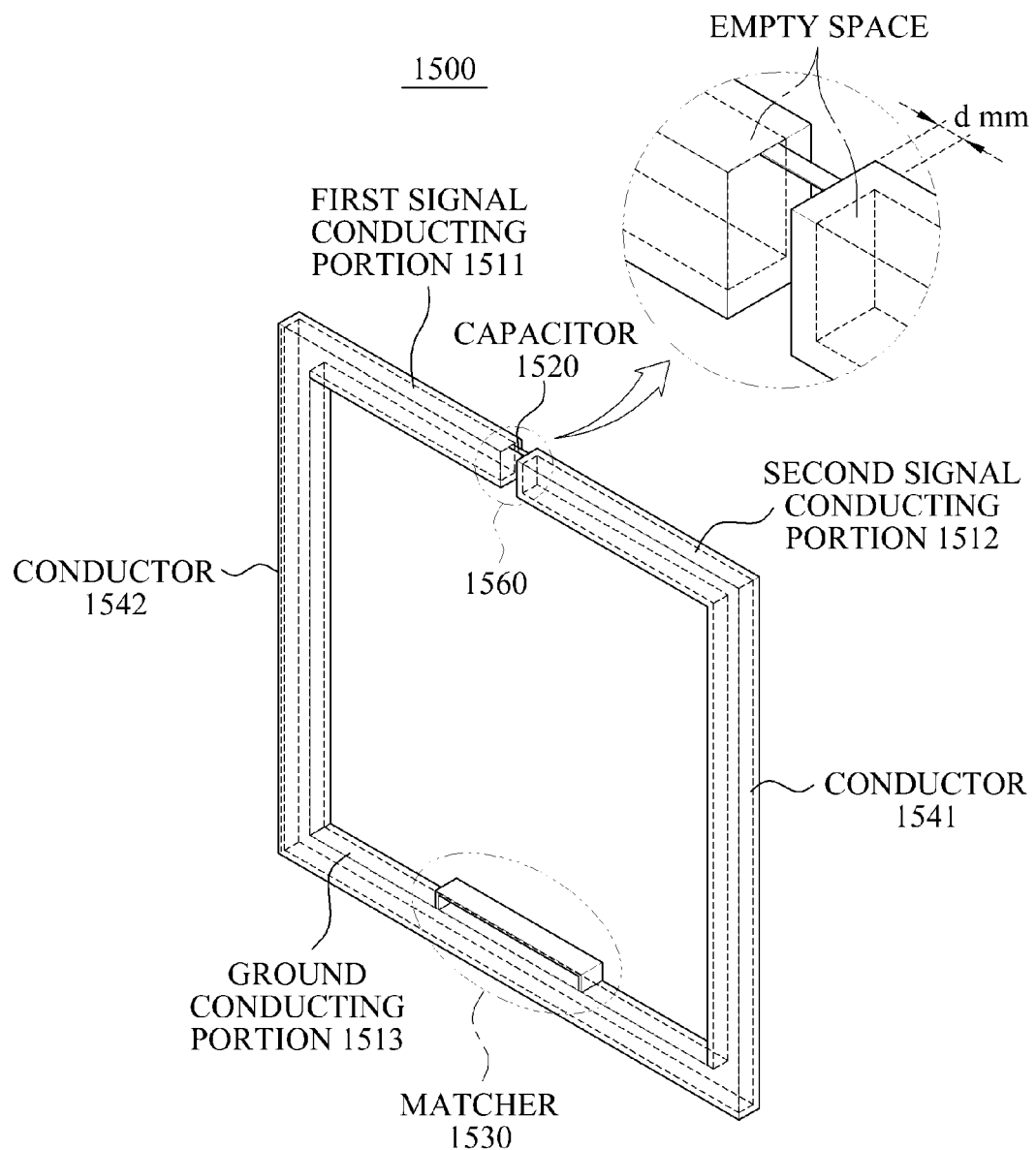

FIG. 15 illustrates an example of a resonator for wireless power transmission, configured as a hollow type.

Referring to FIG. 15, each of a first signal conducting portion 1511, a second signal conducting portion 1512, a ground conducting portion 1513, and conductors 1541 and 1542 of resonator 1500 include an empty or hollow space inside.

At a given resonance frequency, an active current may be modeled to flow in only a portion of the first signal conducting portion 1511 instead of the entire first signal conducting portion 1511, only a portion of the second signal conducting portion 1512 instead of the entire second signal conducting portion 1512, only a portion of the ground conducting portion 1513 instead of the entire ground conducting portion 1513, and only a portion of the conductors 1541 and 1542 instead of the entire conductors 1541 and 1542. In various aspects, when a depth of the first signal conducting portion 1511, the second signal conducting portion 1512, the ground conducting portion 1513, and the conductors 1541 and 1542 are each significantly deeper than a corresponding skin depth in the given resonance frequency, it may be ineffective. The significantly deeper depth may increase a weight or manufacturing costs of the resonator 1500.

Accordingly, in the given resonance frequency, the depth of each of the first signal conducting portion 1511, the second signal conducting portion 1512, the ground conducting portion 1513, and the conductors 1541 and 1542 may be determined based on the corresponding skin depth of each of the first signal conducting portion 1511, the second signal conducting portion 1512, the ground conducting portion 1513, and the conductors 1541 and 1542. If the first signal conducting portion 1511, the second signal conducting portion 1512, the ground conducting portion 1513, and the conductors 1541 and 1542 have an appropriate depth that is deeper than a corresponding skin depth, the resonator 1500 may become light, and manufacturing costs of the resonator 1500 may also decrease.

For example, as shown in FIG. 15, the depth of the second signal conducting portion 1512 may be determined as "d" mm and d may be determined according to $$d = \frac{1}{\sqrt{\pi f \mu \sigma}}.$$

In this example, f denotes a frequency, μ denotes a magnetic permeability, σ and denotes a conductor constant.

As one example, if the first signal conducting portion 1511, the second signal conducting portion 1512, the ground conducting portion 1513, and the conductors 1541 and 1542 are made of copper and have a conductivity of $5.8 \times 10^7$ siemens per meter ($S \cdot m^{-1}$), the skin depth may be approximately 0.6 mm with respect to 10 kHz of the resonance frequency and the skin depth may be approximately 0.006 mm with respect to 100 MHz of the resonance frequency.

Figure 16:
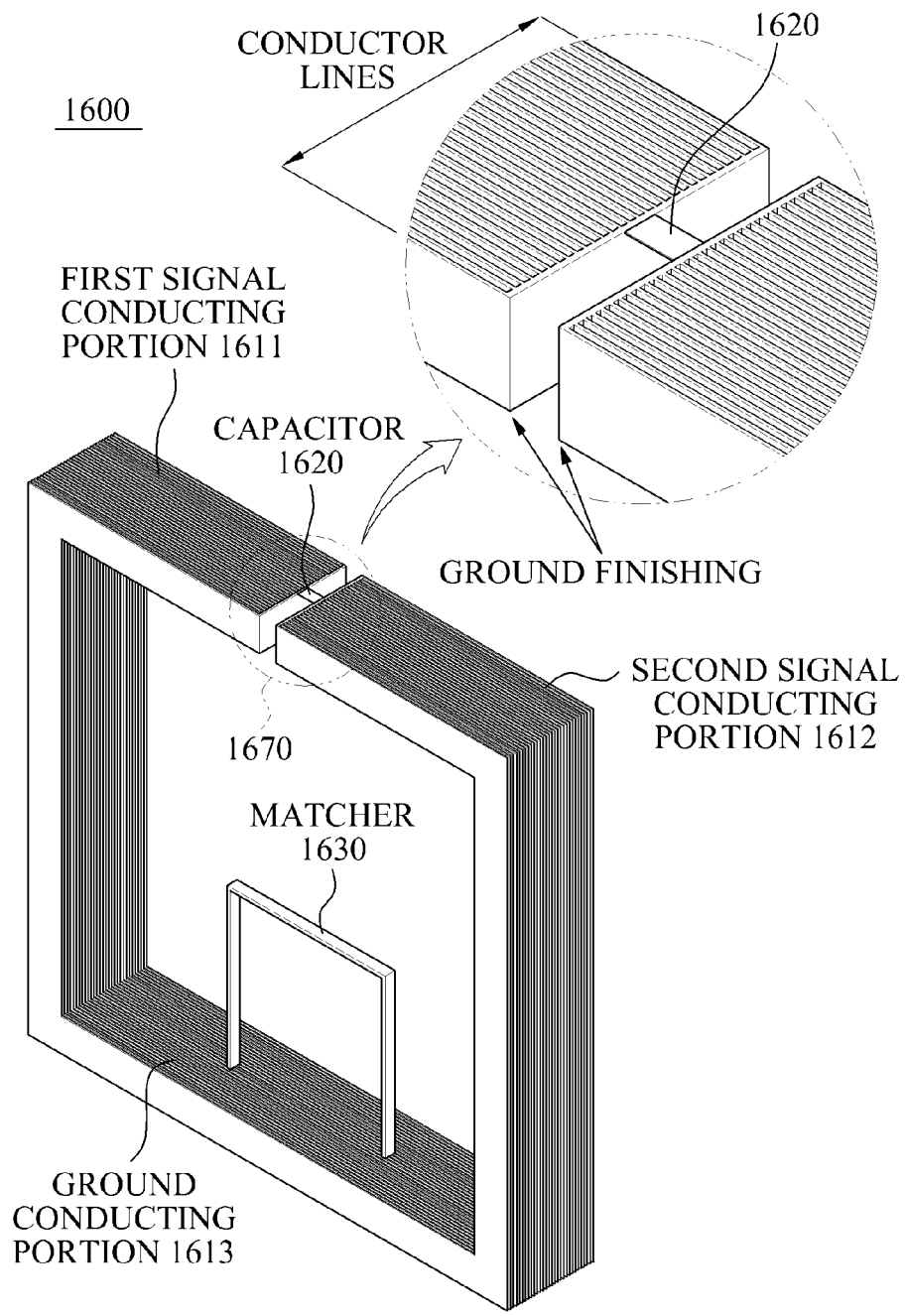

FIG. 16 illustrates an example of a resonator for wireless power transmission using a parallel-sheet.

Referring to FIG. 16, the parallel-sheet may be applicable, for example, to each of a first signal conducting portion 1611 and a second signal conducting portion 1612 which are included in resonator 1600.

Each of the first signal conducting portion 1611 and the second signal conducting portion 1612 may not be a perfect conductor, and thus, may have a resistance. Due to the resistance, an ohmic loss may occur. The ohmic loss may decrease a Q-factor and may decrease a coupling effect.

By applying the parallel-sheet to each of the first signal conducting portion 1611 and the second signal conducting portion 1612, it is possible to decrease the ohmic loss, and to increase the Q-factor and the coupling effect. Referring to a portion 1670 that is indicated by a circle, when the parallel-sheet is applied, each of the first signal conducting portion 1611 and the second signal conducting portion 1612 may include a plurality of conductor lines. For example, the plurality of conductor lines may be disposed in parallel, and may be shorted at an end portion of each of the first signal conducting portion 1611 and the second signal conducting portion 1612.

As described above, if the parallel-sheet is applied to each of the first signal conducting portion 1611 and the second signal conducting portion 1612, the plurality of conductor lines may be disposed in parallel. Accordingly, a sum of resistances having the conductor lines may decrease. As a result, the resistance loss may decrease, and the Q-factor and the coupling effect may increase.

Figure 17:
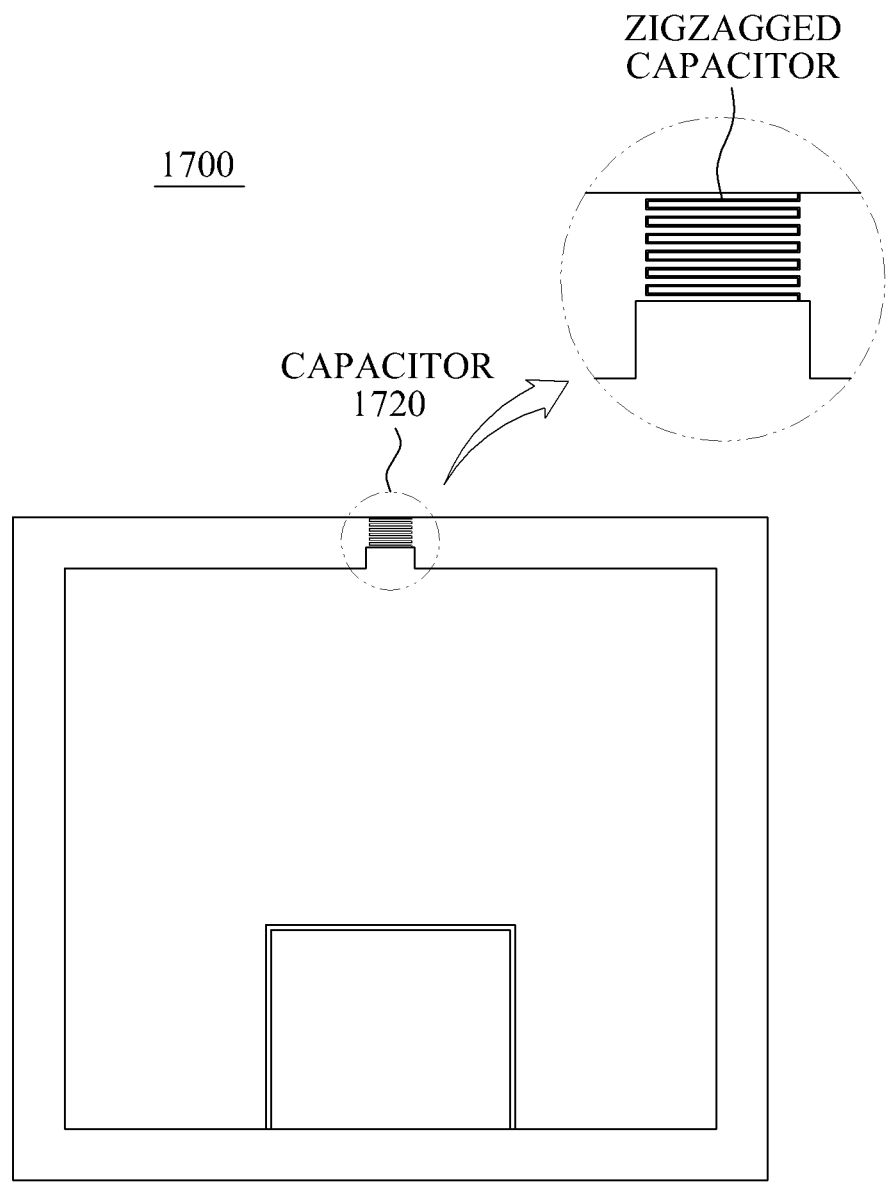

FIG. 17 illustrates an example of a resonator for wireless power transmission that includes a distributed capacitor.

Referring to FIG. 17, capacitor 1720 included in resonator 1700 may be a distributed capacitor. A capacitor as a lumped element may have a relatively high equivalent series resistance (ESR). A variety of schemes have been proposed to decrease the ESR that is contained in the capacitor of the lumped element. In this example, by using the capacitor 1720 as a distributed element, it is possible to decrease the ESR.

As shown in FIG. 17, the capacitor 1720 may have a zigzagged structure. For example, the capacitor 1720 may be configured as a conductive line and a conductor having the zigzagged structure.

As shown in FIG. 17, by employing the capacitor 1720 as the distributed element, it is possible to decrease the loss that occurs due to the ESR. In addition, by disposing a plurality of capacitors as lumped elements, it is possible to further decrease the loss that occurs due to the ESR. Because a resistance of each of the capacitors as the lumped elements decreases through a parallel connection, active resistances of parallel-connected capacitors as the lumped elements may also decrease and the loss that occurs due to the ESR may decrease. For example, by employing ten capacitors of 1 pF instead of using a single capacitor of 10 pF, it is possible to decrease the loss that occurs due to the ESR.

Figure 18A:
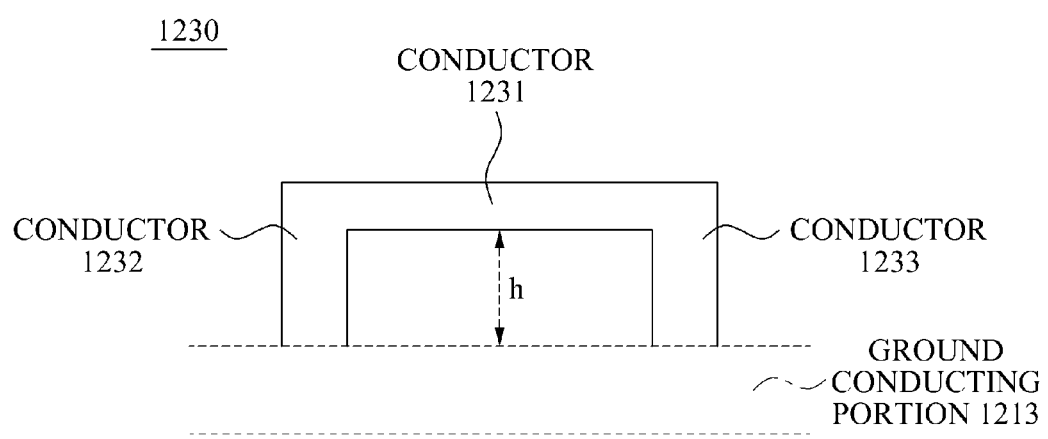
Figure 18B:
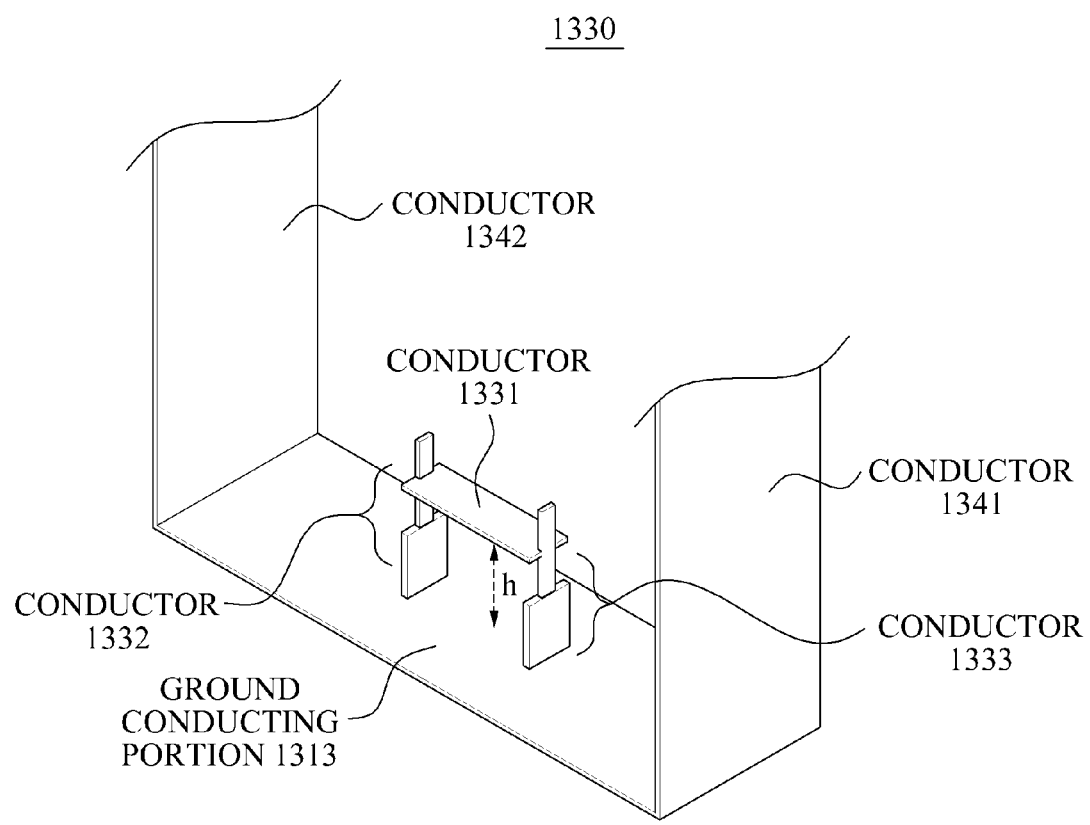

FIG. 18A illustrates an example of the matcher 1230 used in the resonator 1200 of FIG. 12, and FIG. 18B illustrates an example of the matcher 1330 used in the resonator 1300 of FIG. 13.

Referring to FIG. 18A, the matcher 1230 includes a conductor 1231, a conductor 1232, and a conductor 1233. The conductors 1232 and 1233 may be connected to the ground conducting portion 1213 and the conductor 1231. The impedance of the resonator may be determined based on a distance h between the conductor 1231 and the ground conducting portion 1213. For example, the distance h between the conductor 1231 and the ground conducting portion 1213 may be controlled by the controller. The distance h between the conductor 1231 and the ground conducting portion 1213 may be adjusted using a variety of schemes. For example, the variety of schemes may include a scheme of adjusting the distance h by adaptively activating one of the conductors 1231, 1232, and 1233, a scheme of adjusting the physical location of the conductor 1231 up and down, and the like.

Referring to FIG. 18B, the matcher 1330 includes a conductor 1331, a conductor 1332, and a conductor 1333. The conductors 1332 and 1333 may be connected to the ground conducting portion 1313 and the conductor 1331. The conductors 1332 and 1333 may be connected to the ground conducting portion 1313 and the conductor 1331. The impedance of the resonator may be determined based on a distance h between the conductor 1331 and the ground conducting portion 1313. The distance h between the conductor 1331 and the ground conducting portion 1313 may be controlled by the controller.

Similar to the matcher 1230 included in the resonator 1200, in the matcher 1330 included in the resonator 1300, the distance h between the conductor 1331 and the ground conducting portion 1313 may be adjusted using a variety of schemes. For example, the variety of schemes may include a scheme of adjusting the distance h by adaptively activating one of the conductors 1331, 1332, and 1333, a scheme of adjusting the physical location of the conductor 1331 up and down, and the like.

Although not illustrated in FIGS. 13A and 13B, the matcher may include an active element. A scheme for adjusting an impedance of a resonator using the active element may be similar as previously described herein. For example, the impedance of the resonator may be adjusted by changing a path of a current flowing through the matcher using the active element.

Figure 19:
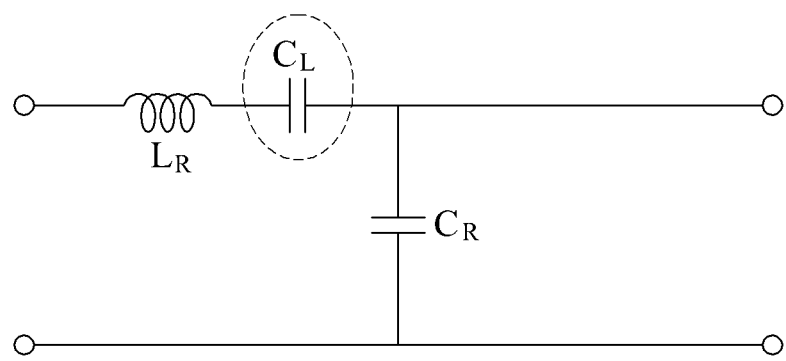
FIG. 19 is a diagram illustrating an example of an equivalent circuit of the resonator of FIG. 7.

FIG. 19 illustrates an example of an equivalent circuit of the resonator 1200 for the wireless power transmission of FIG. 12.

The resonator 1200 for the wireless power transmission may be modeled as the equivalent circuit of FIG. 19. In the equivalent circuit of FIG. 19, $C_L$ denotes a capacitor in the form of a lumped element that is inserted in the middle of the transmission line of FIG. 12.

In this example, the resonator 1200 may have a zeroth resonance characteristic. For example, when a propagation constant is "0", the resonator 1200 may be assumed to have $\omega_{MZR}$ as a resonance frequency. The resonance frequency $\omega_{MZR}$ may be expressed by Equation 2.

$$\omega_{MZR} = \frac{1}{\sqrt{L_R C_L}} \quad \text{[Equation 2]}$$

In Equation 2, MZR denotes a Mu zero resonator.

Referring to Equation 2, the resonance frequency $\omega_{MZR}$ of the resonator 1200 may be determined by $L_R/C_L$. A physical size of the resonator 1200 and the resonance frequency $\omega_{MZR}$ may be independent with respect to each other. Because the physical sizes are independent with respect to each other, the physical size of the resonator 1200 may be sufficiently reduced.

As a non-exhaustive illustration only, the devices described herein may be incorporated in or used in conjunction with mobile devices such as a cellular phone, a personal digital assistant (PDA), a digital camera, a portable game console, and an MP3 player, a portable/personal multimedia player (PMP), a handheld e-book, a portable tablet and/or laptop computer, a global positioning system (GPS) navigation, and devices such as a desktop PC, a high definition television (HDTV), an optical disc player, a setup and/or set top box, and the like, consistent with that disclosed herein. For example, the resonance power receiving apparatus may be any device that requires a power source, e.g., a battery, to be charged, and is not limited to the above-described example of a laptop computer.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for controlling matching in a source-target structure that transmits and receives resonance power, the apparatus comprising:
   a target resonator configured to receive resonance power through magnetic-coupling with a resonance power transmitter;
   a rectifier configured to rectify the received resonance power to generate a direct current (DC) voltage and to provide the DC voltage to a load;
   a load sensor configured to detect the impedance of the load that is provided the DC voltage by the rectifier and a variation in the impedance of the load; and
   a target communicating unit configured to modulate information of the variation in the impedance of the load and transmit the modulated information to the resonance power transmitter, the information being used to control an impedance of a source resonator for matching with the varied impedance of the load;
   a matching-controller configured to control the impedance of the target resonator to match with the varied impedance of the load,
   wherein the impedance of the load, the impedance of the target resonator, and the impedance of the source resonator are matched,
   wherein an impedance of the target resonator is controlled at a point in time at which an amount of required power of the load changes,
   a received-power monitor configured to monitor resonance power that is received from the resonance power transmitter;
   a reflected-power monitor configured to monitor a reflected-power of the received resonance power; and
   a target matching controller (MCU) configured to control the matching-controller to perform impedance-matching in response to either one or both of the reflected power and a variation in power to be used by the load being sensed.

2. The apparatus of claim 1, wherein the load sensor senses a voltage that is applied to the load and an amount of current that is flowing through the load, to detect the variation in the impedance of the load.

3. The apparatus of claim 1, wherein the target communicating unit comprises:
   a communicating unit configured to transmit the information of the variation in the impedance of the load through a resonance frequency of the target resonator, to the resonance power transmitter.

4. The apparatus of claim 1, wherein the impedance-matching is performed to adjust the impedance to 50 ohms.

5. The apparatus of claim 1, wherein the target MCU controls the matching-controller based on one of a first table that records a value of a variation in an impedance corresponding to a variation in the power to be used by the load and a second table that records a value of a variation in an impedance corresponding to a charged level of the load.

6. The apparatus of claim 1, wherein the target MCU controls the target resonator to have the same impedance as the impedance of the load.

7. An apparatus for controlling matching in a source-target structure that transmits and receives resonance power, the apparatus comprising:
   a source resonator configured to transmit resonance power through magnetic-coupling with a resonance power receiver;

a matching-controller configured to control impedance-matching between the source resonator and a target device included in the resonance power receiver;

a source power monitoring unit configured to monitor resonance power that is applied to the source resonator;

a reflected-power monitoring unit configured to monitor a reflected-power of the resonance power that is output from the source resonator;

a source matching controller (MCU) configured to control the matching-controller to perform the impedance-matching between the source resonator and the target device, in response to either one or both of the reflected power and a variation in power to be used by the resonance power receiver being sensed, a source communicating unit configured to receive information associated with the variation in the impedance of a load, from the resonance power receiver, wherein the source MCU controls the matching-controller to perform the impedance-matching based on the information that is associated with the variation in the impedance of the load, wherein the matching-controller is further configured to control an impedance of the source resonator based on adaption of an impedance of the target resonator, the adaption being generated at a point in time at which an amount of required power of the load changes, wherein the impedance of the load, the impedance of the target resonator, and the impedance of the source resonator are matched.

8. The apparatus of claim 6, wherein:

the matching-controller controls the impedance of the source resonator to be the same as the impedance of the load, and the impedance of the load being sensed by the resonance power receiver has a value between 10 ohms and 100 ohms.

9. A method of controlling matching in a source-target structure that transmits and receives resonance power, the method comprising:

rectifying received resonance power to generate a direct current (DC) voltage and providing the DC voltage to a load;

monitoring the received resonance power and a reflected-power of the received resonance power;

detecting impedance of the load that is provided the DC voltage by the rectifier and a variation in the impedance of the load;

controlling the impedance of a target resonator to match with the varied impedance of the load modulating information of the variation in the impedance of the load and transmitting, to a resonance power transmitter, the modulated information, the information being used to control an impedance of a source resonator for matching with the varied impedance of the load; and receiving, from the resonance power transmitter, resonance power based on the variation in the impedance, wherein the transmitting comprises transmitting, to the resonance power transmitter, information of an identification of the resonance power receiver, wherein an impedance of the target resonator is controlled at a point in time at which either one or both of the reflected power and a variation in an amount of power to be used by the load is sensed, wherein the impedance of the load, the impedance of the target resonator, and the impedance of the source resonator are matched.

10. The method of claim 9, wherein the variation in the impedance of the load is detected by sensing a voltage that is applied to the load and an amount of current flowing through the load.

11. The method of claim 9, further comprising:

receiving, by the resonance power transmitter, the information of the variation in the impedance of the load, and performing impedance-matching of a source resonator based on the information of the variation in the impedance of the load.

12. A method of controlling matching in a source-target structure that transmits and receives resonance power, the method comprising:

transmitting, to a resonance power receiver, the resonance power through a source resonator;

monitoring the resonance power that is output from the source resonator;

monitoring a reflected-power of the resonance power that is output from the source resonator;

receiving information associated with the variation in the impedance of a load, from the resonance power receiver; and performing impedance-matching between the source resonator and a target device included in the power resonance receiver based on the information that is associated with the variation in the impedance of the load, in response to either one or both of the reflected power or a variation in power to be used by the resonance power receiver being sensed, wherein an impedance of the source resonator is controlled based on an adaption of an impedance of the target resonator, the adaption being generated at a point in time at which an amount of required power of the load changes, wherein the impedance of the load, the impedance of the target resonator, and the impedance of the source resonator are matched.

13. The method of claim 12, further comprising:

receiving, by the resonance power receiver, the resonance power through the target resonator;

monitoring the resonance power that is received by the target resonator;

monitoring a target reflected power of the resonance power that is received by the target resonator; and performing, by the resonance power receiver, impedance-matching of the target resonator, when at least one of the target reflected power or a variation in power to be used by the load is sensed.

14. The method of claim 13, wherein the impedance-matching of the target resonator is performed based on one of a first table that records a value of a variation in an impedance corresponding to a variation in the power to be used by the load and a second table that records a value of a variation in an impedance corresponding to a charged level of the load.

15. A wireless power apparatus for powering a load with received wireless power, the wireless power apparatus comprising:

a resonator configured to receive resonance power wirelessly from a source through magnetic coupling with the source;

a rectifier configured to rectify the received power to generate a direct current (DC) voltage and to provide the DC voltage to the load;

a sensor configured to detect the impedance of the load that is provided the DC voltage by the rectifier and to detect a variation in the impedance of the load, while the resonator is simultaneously receiving wireless power;

a received-power monitor configured to monitor resonance power received from the source;

a reflected-power monitor configured to monitor a reflected-power of the received resonance power;

a matching controller (MCU) configured to modulate information about the impedance of the load and the variation in the impedance of the load and transmit the modulated information to the source, the information being used to control an impedance of a source resonator for matching with the varied impedance of the load; and, a target matching controller configured to control the matching controller to perform impedance-matching in response to either one or both of the reflected power and a variation in power to be used by the load being sensed, wherein the MCU controls impedance of the resonator to match with the varied impedance of the load, wherein the impedance of the load, the impedance of the target resonator, and the impedance of the source resonator are matched, wherein an impedance of the resonator is controlled at a point in time at which an amount of required power of the load changes.

16. The wireless power apparatus of claim 15, wherein the sensor detects the impedance of the load and the variation in the impedance of the load by sensing a voltage applied to the load and an amount of current flowing through the load.

17. The wireless power apparatus of claim 15, further comprising a matching controller to perform impedance matching between the resonator and the load.

18. The wireless power apparatus of claim 17, wherein the MCU transmits information to the source to enable the source to transmit an amount of wireless power that matches the amount of power to be used by the load.

19. The wireless power apparatus of claim 15, wherein the wireless power apparatus and the load are included in the same device.

20. The wireless power apparatus of claim 15, wherein in response to the amount of power to be used by the load decreasing, the MCU transmits information to the source to indicate to the source to decrease the amount of resonance power that is transmitted.

21. The wireless power apparatus of claim 15, wherein in response to the amount of power to be used by the load increasing, the MCU transmits information to the source.

* * * * *